United States Patent [19]

Smith et al.

[11] Patent Number: 4,652,769

[45] Date of Patent: Mar. 24, 1987

[54] MODULE POWER SUPPLY

[75] Inventors: Robert B. Smith, Loveland; Gary E. Thornton, Ft. Collins, both of Colo.

[73] Assignee: Ion Tech, Inc., Ft. Collins, Colo.

[21] Appl. No.: 580,107

[22] Filed: Feb. 14, 1984

[51] Int. Cl.$^4$ ............................ H02J 3/00; H05K 5/00
[52] U.S. Cl. ........................................ 307/31; 307/24; 307/85; 361/413; 361/343; 361/394
[58] Field of Search ................. 307/31, 24, 26, 35, 307/85, 86, 64, 130, 28, 141, 141.4, 143, 140, 43, 598, 596, 597; 323/267; 361/413, 1, 343, 392–394, 397, 166; 364/492, 900; 340/825.06, 825.07

[56] References Cited

U.S. PATENT DOCUMENTS

| | | | |
|---|---|---|---|
| 2,942,123 | 6/1960 | Schuh, Jr. ........................... | 307/597 |
| 3,532,939 | 10/1970 | Aviander ........................... | 307/598 X |
| 3,841,249 | 10/1974 | Geyer et al. ........................ | 307/86 X |
| 4,191,992 | 3/1980 | Johannessen ........................ | 307/86 X |
| 4,204,249 | 5/1980 | Dye et al. .......................... | 307/64 X |
| 4,290,023 | 9/1981 | Greenfield ......................... | 330/9 |
| 4,322,817 | 3/1982 | Kuster ............................. | 363/41 X |
| 4,344,003 | 8/1982 | Harmon et al. ..................... | 363/60 X |
| 4,387,442 | 6/1983 | Stuehler .......................... | 364/900 |
| 4,454,552 | 6/1984 | Barnes et al. ..................... | 361/412 X |
| 4,456,872 | 6/1984 | Froeschle ......................... | 323/267 |
| 4,490,682 | 12/1984 | Poulo ............................. | 330/9 |

Primary Examiner—A. D. Pellinen
Assistant Examiner—Todd E. DeBoer
Attorney, Agent, or Firm—Rosen, Dainow & Jacobs

[57] ABSTRACT

A multisource power supply for supplying a plurality of various power levels from a common AC source, including a plurality of switchable power source modules, a power line conditioner PLC including a high voltage switching supply and logic level supply coupled between the AC source and each of the power source modules, a common controller coupled to each of the power source modules for setting and monitoring the output of each of the modules, each of the modules being removable from the multisource power supply, and an interlock control responsive to removal of any of the modules for disabling the high voltage switching supply.

14 Claims, 18 Drawing Figures

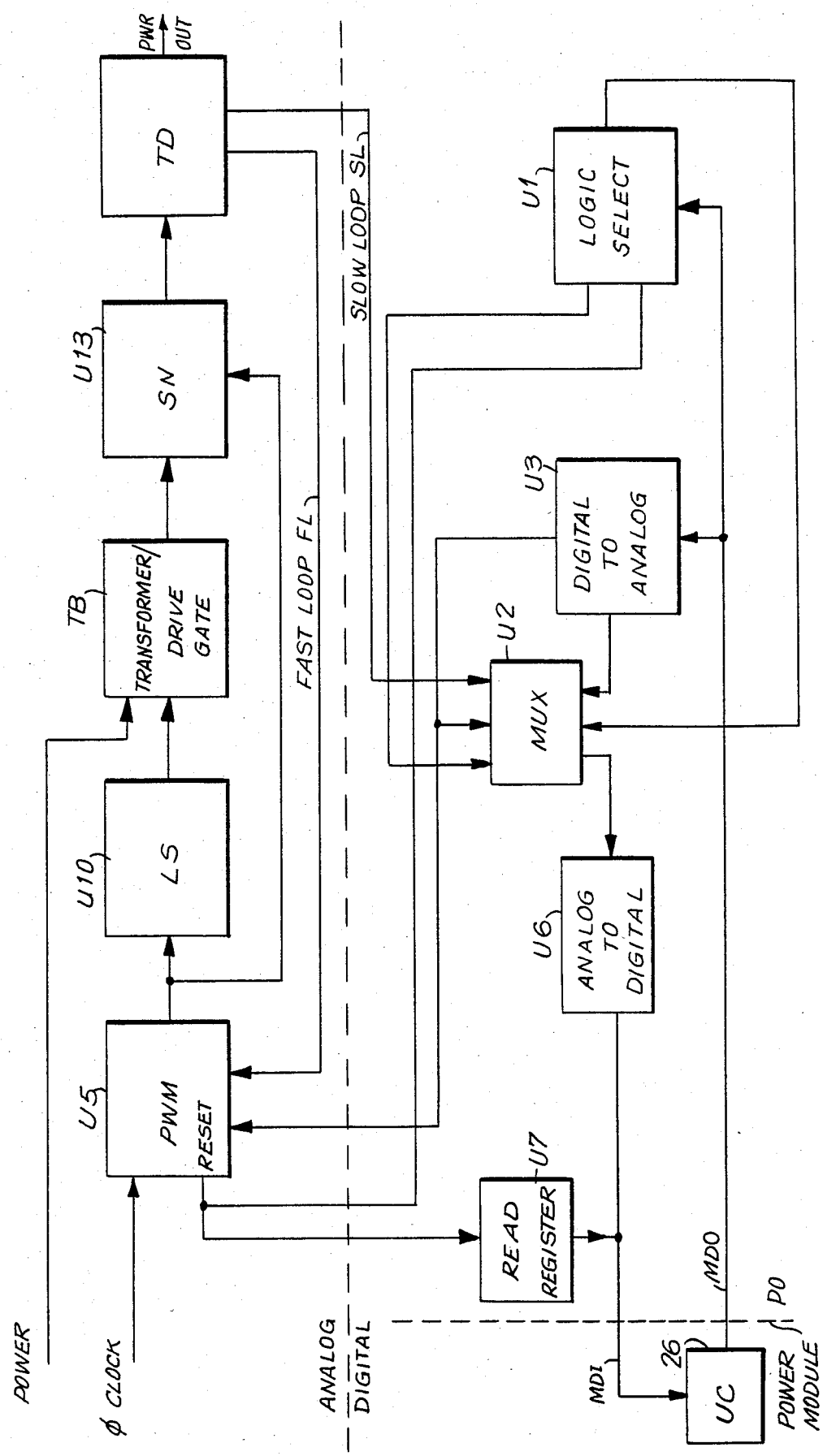

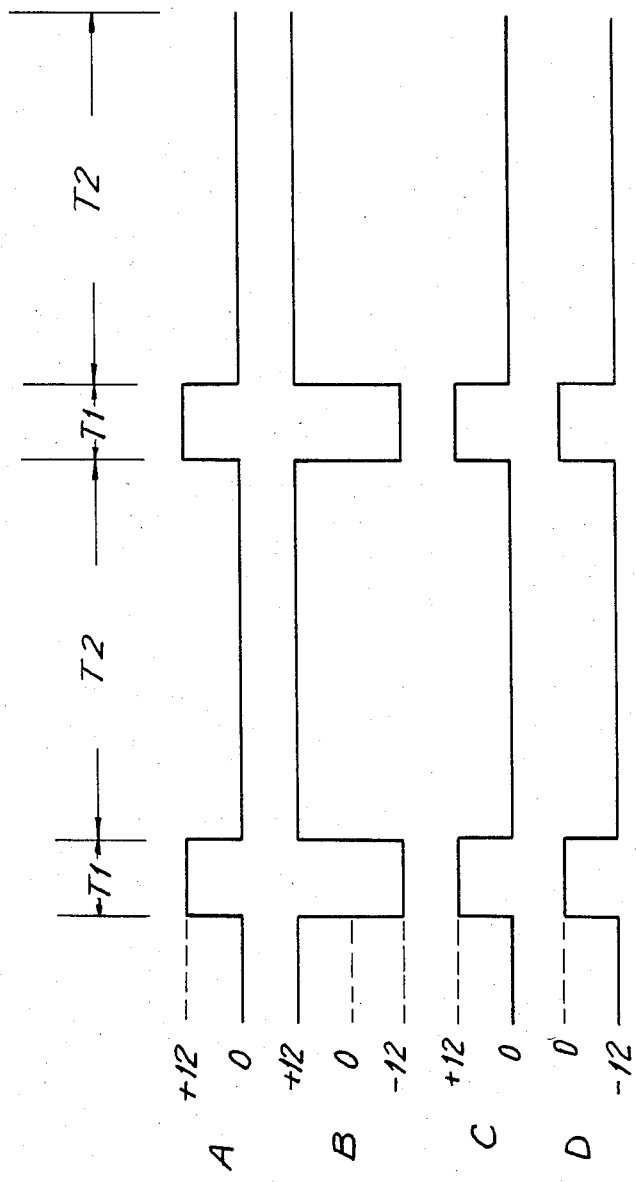

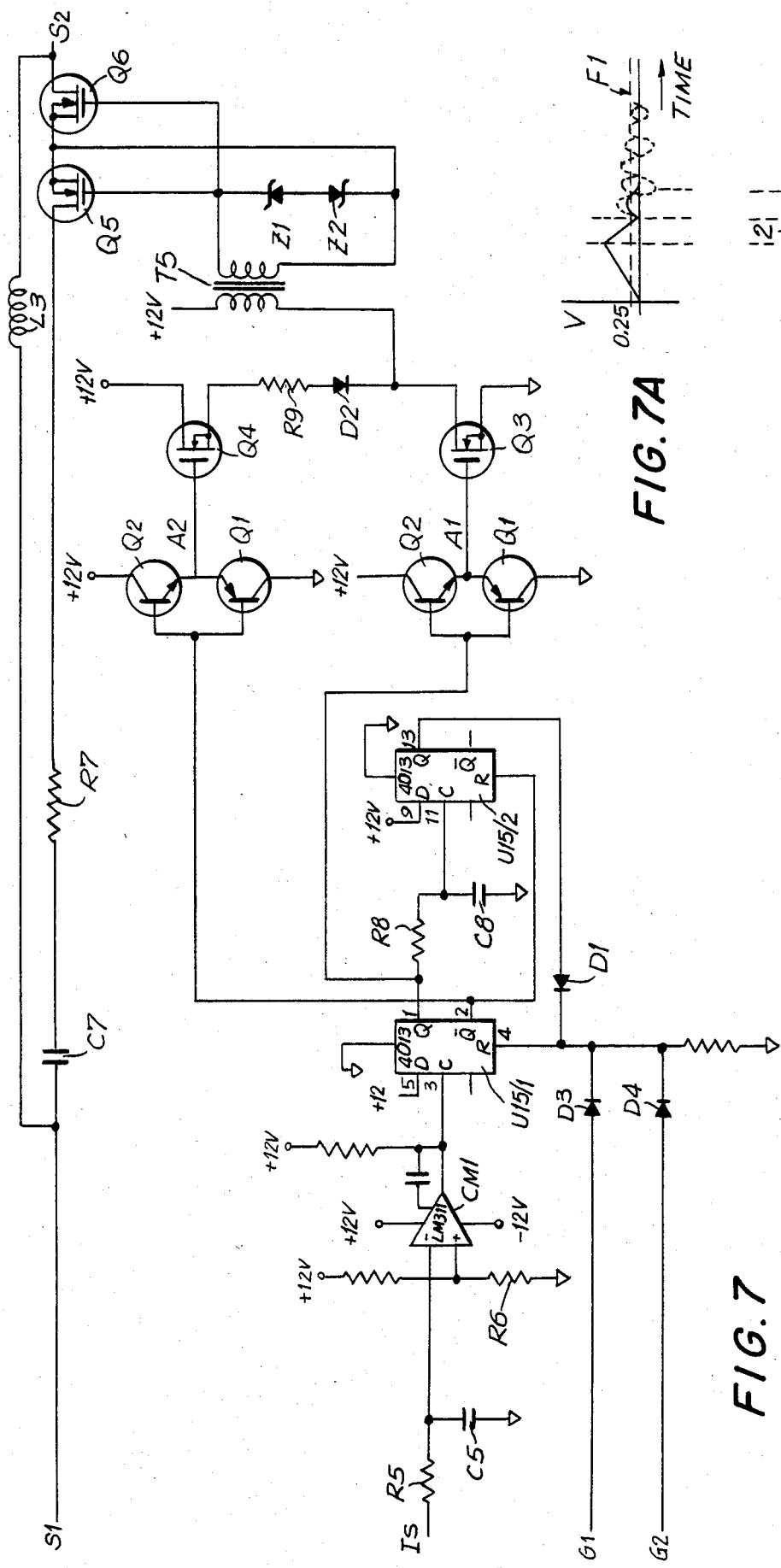
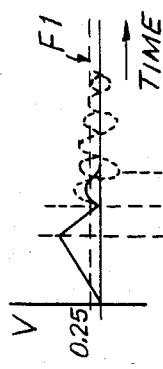
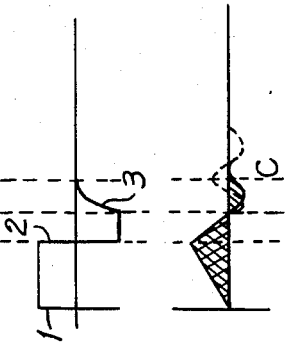
FIG.7A
FIG.7B
FIG.7C
FIG.7

MODULE POWER SUPPLY

BACKGROUND OF THE INVENTION

The present invention relates to modular supplies and more particularly to a novel and unique power supply organization providing a number of significant features under common control of a pre-programmed microprocessor.

The utilization of power supplies in modern technology requires precise levels of control as well as accurate monitoring and adequacy of safety features. In addition, power supplies should be easy to use as well as having features which increase the flexibility and utility of such systems.

In particular applications where groups of individual power supplies, all under common control, are required, and especially where high power requirements are needed in conjunction with both AC and DC supplies, prior art systems have been lacking in the capability to fully integrate, monitor and control supplies exhibiting such features. More particularly, in areas requiring multiple sources, and wherein high power must be supplied to a plurality of areas, safety features should be of paramount importance. Thus design integration of an accurate, controllable multiple supply system, including the use of common controllers and safety interlocks, is desirable.

It is therefore the principal object of the present invention to provide a modular power supply, capable of providing multiplicities of power outputs, which may be easily adjusted by the user, and which may be monitored and controlled for accuracy in accordance with the desired values.

An example wherein multiplicities of individual supplies may be utilized under common control is in the implementation of a multi-electrode device, such as an ion source. In a device of this type, several diverse supplies of both AC and DC nature are required. In addition, some of the supplies may be interrelated, and all of the energy output should be either key-enterable or otherwise changed in accordance with various energy settings which may be applied to the various filaments and electrodes of such a device. Prior art devices normally utilize heavy inductive elements, large scale power transformers, and effect variation in output conditions by means of Variacs of other similar large scale power control devices. These devices are not only inefficient, but require large amounts of space as well as cooling capacity. In addition, each of the supplies is conventionally unrelated, each being controlled by means of the operator simply setting the values of each supply in accordance with desired outputs. In addition to the lack of an ability to effect common control over a multiplicity of supplies in such conventional technology, the use of previous switch mode power supplies has created additional problems with respect to high voltage levels which make such supplies difficult to use. Finally, the inability to provide adequate safety interlocks in the system wherein pluralities of power supplies are necessarily employed is a further disadvantage inherent in such systems.

It is a further object of the invention to provide a power supply employing modular units which may each be removed and replaced, and further provided with an interlock system which prevents high power from being present in the open areas of such a modular system when any individual unit is removed.

It is another object of the present invention to provide a common controller for a multiplicity of power supplies which provides for scanning of control and insertion of new value, as well as monitoring external conditions to determine if interrupts or power supply shut downs should be initiated.

It is a still further object of the present invention to provide a switching power supply wherein more efficient utilization of the duty cycle of the pulses employed in such supply eliminates the need for excessive size of inductive elements.

It is another object of the present invention to provide an improved feedback control system for more accurately effecting control of output conditions.

It is a further object of the present invention to improve accuracy of measured values in a power supply by automatically calibrating for component errors at start-up conditions.

BRIEF DESCRIPTION OF THE INVENTION

The foregoing objects are achieved in accordance with the present invention by a unique, regulated series of pulse switching systems, commonly controlled in an integrated modular power supply. Thus, the present invention utilizes a common controller and a common power line conditioner which provides high voltage switching potential as well as a plurality of staggered switch signals to a plurality of separate and individual pulse switching power supply modules, each designed to provide the output actually required for individual use to a system demanding pluralities of different power conditions. The invention also uses an interlock system to disconnect the high power voltage supply without removing low power logic signals, thereby allowing the system to continue to operate in modes which would allow high voltage to be reinstalled safely upon the reinsertion of a module or upon the restoration of an interrupt condition. In addition, the modular power supplies are provided with level shifting circuits for increasing the swing of the pulse signals to drive the power transformers for ultimate power delivery, and with damping or snubbing circuitry which senses appropriate moments in individual cycles for damping out ringing current which may be present.

The present invention in addition utilizes multiple feedback loops for correction of variances or changing desired output values. A fast feedback loop is employed as a direct hardware connection, as well as a slower feedback loop through microprocessor control for causing additional adjustments. In addition, calibration circuitry and software are provided for increasing the accuracy of the system. Displays, located on each module, provide indication of monitored output conditions and conditions selected by the operator for placement into the modules for ultimate power delivery. Limit values may also be preset, and alarm conditions set as well. All of the foregoing features are under common control by virtue of a single microprocessor module, located in proximity with the individual power modules, and acting to perform all of the monitoring and control functions noted herein above.

The foregoing general description of the present invention will become apparent from the following more detailed description and appended drawings.

DESCRIPTION OF DRAWINGS

FIG. 5 is a general block diagram of a module power supply.

FIG. 6, 6A–E shows the detailed circuit of FIG. 5, and 6F the waveforms.

FIGS. 7 and 7A-C are a detailed circuit diagram of the snubber circuitry and waveform diagrams therefor.

DETAILED DESCRIPTION OF THE PREFERRED EMBODIMENT

Figure 1:
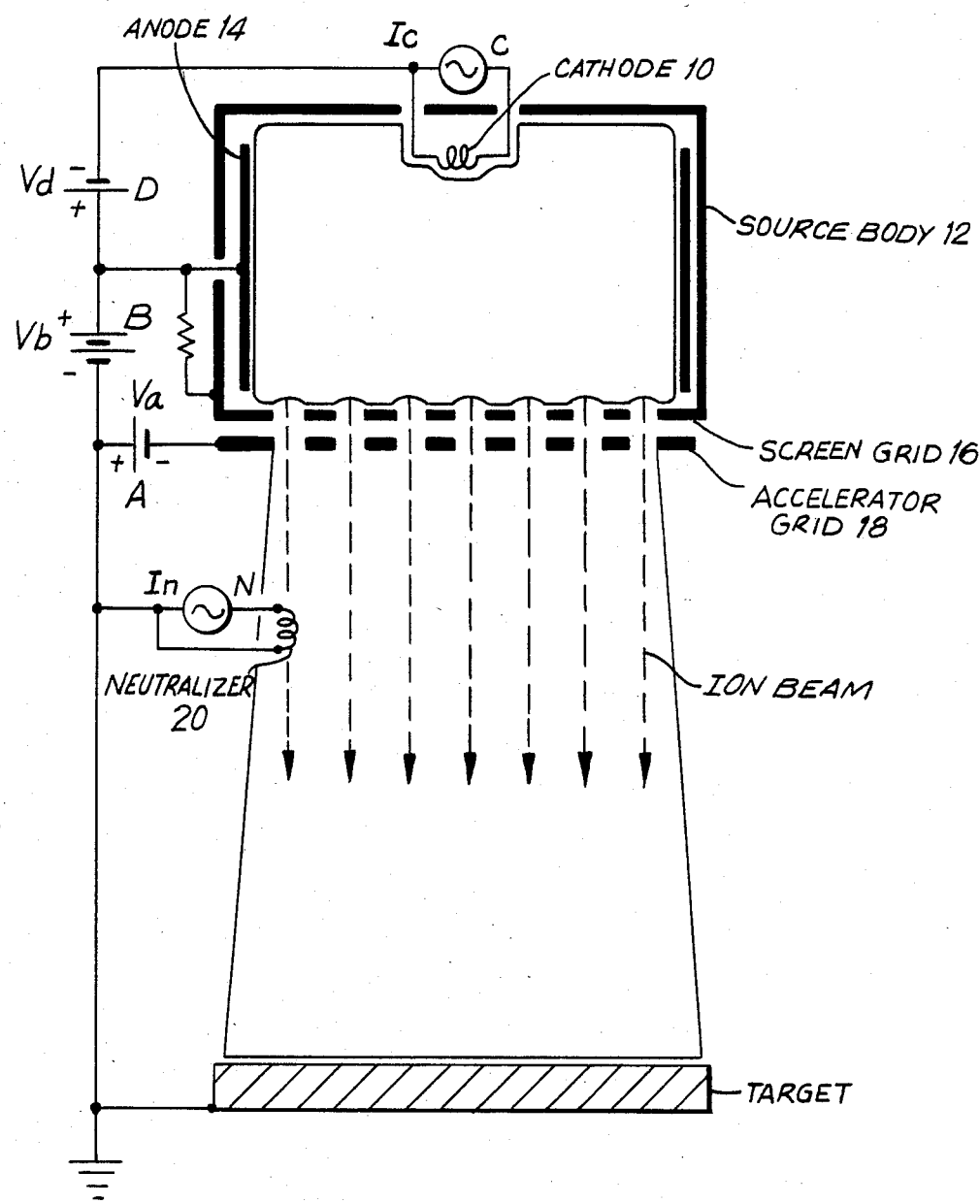
FIG. 1 is an illustration of an ion source, requiring a plurality of multiple power supplies, and usable in accordance with the power supply of the present invention.

Referring to FIG. 1, a typical broad beam multiaperture ion source is illustrated. As shown, it consists of a cathode filament (10), a source body (12), an anode (14), an ion extraction system consisting of a screen grid (16), an accelerator grid (18), and a neutralizer filament (20). In order to operate the source, a separate power supply is required for each of these components. As shown in FIG. 1, the cathode filament (10) is activated with a filament current source (C), the anode with a discharge potential source (D), the source body with a beam potential source (B), the accelerator grid with an accelerator potential source (A), and the neutralizer filament with a filament current source (N). By appropriate adjustments of the relative potentials between the various active elements including cathode current ($I_c$), discharge potential ($V_d$), beam potential ($V_b$), accelerator potential ($V_a$) and neutralizer current ($I_n$), appropriate control of the ion source may be attained. Descriptions of ion source and the required potentials necessary for providing appropriate beam configurations are conventional, and will not be described further herein. It will be understo'od that ion sources may vary in configuration and the ion source shown in FIG. 1 is intended as illustrative only, since the present invention relates to an integrated power supply for the provision of the required potentials and currents under a common control.

Figure 2:
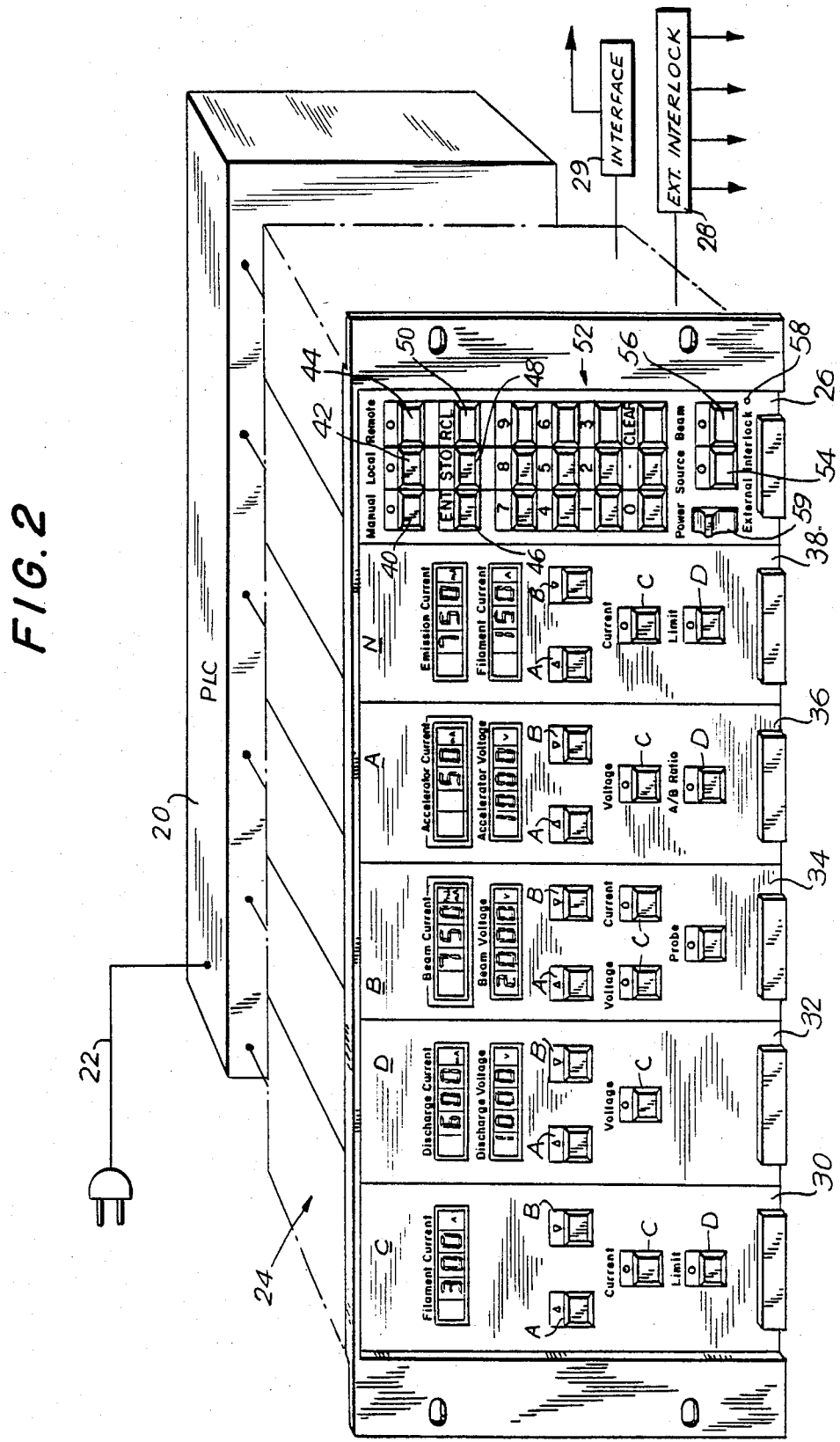
FIG. 2 is a general illustration, in block form, of the power supply of the present invention.

The maintenance of the various voltage and current levels required for each of these various supplies normally requires a large number of individual supplies of varying voltage and current levels. The purpose of the invention, to provide a novel and unique integrated and controllable power supply, is generally illustrated with reference to FIG. 2, wherein a general block diagram of a power supply which may be employed in conjunction with an ion source and which is the subject of the present invention is described in greater detail. As shown in FIG. 2, the present invention includes a power line conditioner (PLC) 20, receiving power from a main supply along a line 22. The PLC 20 is in turn coupled to a plurality of module power circuits (MPC) 24, each of which provides appropriate power to the individual ion source elements described in conjunction with FIG. 1.

Each module of the MPC 24 is under control of a microprocessor controller module (UC) 26, which in turn monitors the PLC 20. The UC 26 provides for monitoring of external conditions through an interlock interface 28, as well as a communication interface 29 such as the RS232C standard, enabling communication to other standardized data communication or controlled devices.

The MPC 24 is made up of a plurality of power supply modules, each providing power to an appropriate element of the ion source. Thus, module 30 provides cathode filament current source C, module 32 provides potential source D, module 34 provides the anode with potential source B, module 36 provides the potential source A and the module 38 provides the neutralizer filament current source N. The front panel also shows the microprocessor controller module UC 26. Each of the modules is provided with appropriate displays of respective values which are provided by that module. Each of the modules also includes two switches, labelled A and B, which are used to adjust selected values in the appropriate direction indicated by the arrow on the key on the front panel of the respective module on which the switches are located. The switch located beneath the switches A and B, labelled C, indicates a particular parameter which is to be adjusted in the affiliated module. Modules 30 and 38 may each be preset in accordance with a predetermined current limit, and the limit value is viewed by means of the limit switch D located on the respective module. On module 36, a ratio of accelerator current to beam current may be preset as a limit, and the limit switch D, labelled A/B ratio, on module 36 is utilized for presetting this value.

On the UC module (26) three switches are located near the bottom of the module. Activation of the POWER switch (59) applies power from the input line (22) to the PLC (20) which in turn supplies input power to the MPC (24). The SOURCE switch (54) allows the output of the cathode filament module (30), the discharge module (32) and the neutralizer filament module (38) to be applied to the ion beam source. Indication that this switch has been activated is given by an LED indicated by the small circle which is mounted just above this switch. The BEAM switch (56) allows the output of the beam module (34) and the accelerator module (36) to be applied to the ion beam source. Indication that this switch has been activated is also provided by means of an LED. Turning off the BEAM switch reverts the supply to the source on condition. Turning off the SOURCE switch before turning off the BEAM switch automatically turns off all supplies. The safety feature of this deactivation is self evident. The beam and accelerator (high voltage) modules cannot be turned on unless the source is on. Both beam and source are necessary for normal operation. Immediately below the BEAM switch is the EXTERNAL INTERLOCK LED (58). This is part of an external interlock circuit previously noted above and referred to as external interlock (28) and is provided for the purpose of allowing the system users to preset into the external interlock any specific conditions with respect to the ion source that may prevent the power supply from operating. These conditions may include such items as lack of proper vacuum in the working chamber, improper placement of target, improper closing of safety gates and so on. The interlock LED thus provides a visual indication of completion of a circuit for the purpose of providing an indication to the microprocessor controller module (26)

that the external interlock conditions have been satisfied. Failure to satisfy these conditions will inhibit any operation of the microprocessor control circuitry, thereby preventing input power from being applied to the modules 30, 32, 34, 36 and 38. Flashing of the EXTERNAL INTERLOCK LED (58) will indicate the presence of this condition.

Located in the middle of the UC (26) is a numeric key pad (52). By activating switch C or D on a module, a new value for that particular parameter can be set by use of the numerical keyboard. This new value would then be entered into the appropriate module by the activation of the "ENT" Switch (46) located immediately above the keyboard. After the appropriate values have been entered into each of the modules, this entire set of conditions can be stored in any one of nine non-volatile memories by activating the "STO" Switch (48) followed by activation of the appropriate number switch on the keyboard. To recall the complete set of conditions from the non-volatile memory, the "RCL" Switch (50) is activated followed by activation of the appropriate number switch on the keyboard. This set of conditions would then be sent to the modules by depressing "ENT" (46) switch.

The final three switches located on the UC module (26) are located near the top and are labeled "MANUAL" (40), "LOCAL" (42), and "REMOTE" (44).

Activation of the "MANUAL" switch (40) allows the value displayed on the front panel to be changed by means of appropriate manipulation of the switches on the front panel. Selection of the value to be changed is determined by activation of the appropriate switch C, an indication provided to the operator of activation of this switch is provided by means of an LED, indicated by the small circle which is mounted just above each of this switches. For example, if it is desired to change the filament current on module 30, it is only necessary to activate switch C on module 30, proper activation being indicated by the lighting of the LED located just above switch C. The filament current can then be changed using one of two methods. First, by use of switches A and B, the value can be adjusted up by activation of switch A or down by activation of switch B. Internal circuitry is preset so that initial pressure on switch A or B will cause a slow change of the displayed value, and maintaining pressure on switch A or B will then cause the value to change more rapidly. Switch A or B is released when the desired value is reached. The second method of changing the value is to use the keyboard (52) located on the UC module (26). The new value is entered usin9 the keyboard and sent to the cathode module by depressing the "ENT" switch (46). Values may be increased or entered up to the preset limit. This limit is set by means of activation of the limit switch D. When the limit switch D is activated, the display changes to the formerly preset limit. This limit can then be changed by either appropriate manipulation of switches A and B or by entering a new value with the keyboard. With the limit set and using switches C and A, the cathode current can be increased to the limit value. Upon reaching this value, the LED on the limit switch will come on and remain on as long as switch A is activated. The increase in cathode current will stop at the limit value. When entering values from the keyboard, if the new value selected exceeds the limit an error message will be displayed. It will be understood that similar action takes place with respect to modules (36) and (38) and with the exception of the setting of limits to modules (32) and (34). In the case of module (36), the accelerator current may be limited by means of an appropriate ratio of accelerator to beam current. This ratio expressed in terms of percent such as, for example, 10 percent, is utilized to set a limit on the amount of accelerator current allowable for any given beam current.

After all of the operating values and limits have been defined and entered and the source is successfully operating under these conditions it is possible to store these conditions in the non-volatile memory. This is accomplished by first activating the "STO" Switch (48) and then activating the keyboard switch corresponding to the selected memory. Storing of these operating conditions can only be operated in the MANUAL mode.

Activation of the LOCAL Switch (42) allows operation in one of two modes; either the uncontrolled mode or the controlled mode depending upon the position of a switch located inside the UC (26) module. In the uncontrolled mode beam voltage, beam current and accelerator voltage can be adjusted from the front panel by use of switches C and either A and B or keyboard (52) and the "ENT" switch (46) as described earlier. The remaining parameters such as cathode filament current, discharge voltage and neutralizer filament current cannot be changed on the front panel. Instead they are adjusted by the internal logic to whatever extent is necessary to obtain the requested values of beam voltage and beam current. It is also possible in this mode of operation to recall conditions in this memory. Further, it is possible for the operator to activate the POWER switch (59), turn on and off the SOURCE switch (54) and the BEAM switch (56) or to activate the MANUAL switch (40) or the REMOTE switch (44). In the local controlled mode, it is not possible to change any parameters from the front panel. It is only possible to recall existing verified operating conditions from the non-volatile memory. As was the case in the uncontrolled mode, it is not possible to store operating conditions in the memory. From the local controlled mode it is only possible to activate the REMOTE switch (44). It is not possible to activate the MANUAL switch (40). This mode would primarily be used in production applications where operation at only predefined conditions is required and operator intervention cannot be allowed.

Activation of the REMOTE switch (44) allows a remote microprocessor to control the various modules and to recall conditions from the memory. It can also turn on and off the BEAM switch (56) and the SOURCE switch (54). This remote control is accomplished by means of a standard interface (29) such as an RS232. When operating in this mode it is not possible to change any parameters by means of switches located on the front panels. Nor is it possible to store or recall any information from the memory. The operator can turn on and off the main POWER switch (59) and can also turn off the SOURCE switch (54) and the BEAM switch (56). However, the operator cannot turn the source and beam switch on. Only the REMOTE microprocessor can turn the SOURCE and BEAM switch on. The operator can also activate the LOCAL switch (42) and if it is operating in the uncontrolled mode, can then actuate the MANUAL switch (40).

Figure 3:
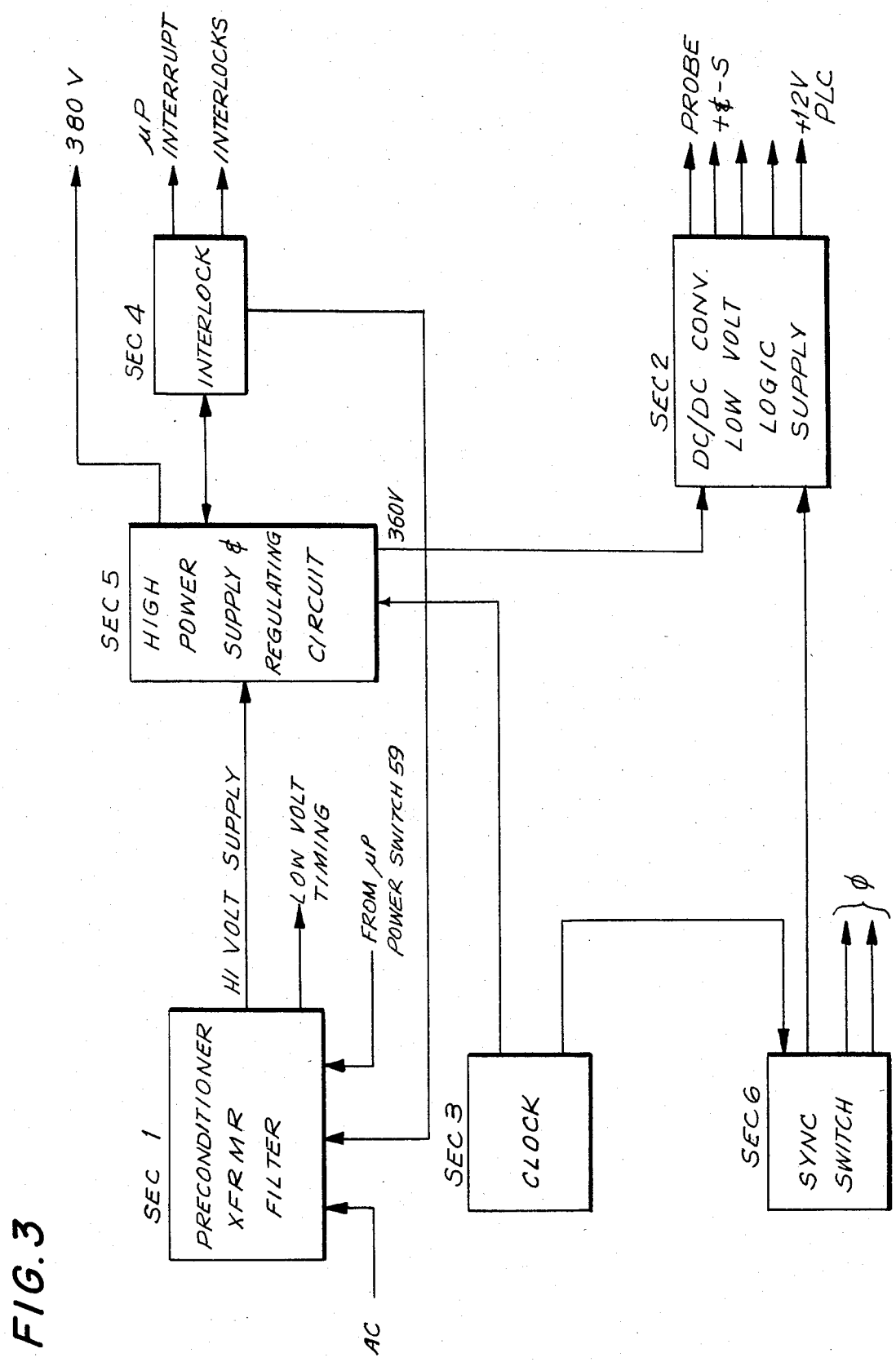
FIG. 3 is a block diagram of the power line conditioning circuitry.

Referring to FIG. 3, a generalized block diagram of the PLC circuit 20 shown in FIG. 2 is illustrated. As shown in FIG. 3, a plurality of sections are provided for the purpose of interrelating the various functions to be provided by the PLC 20. Thus, Section 1 is a preconditioning circuit which includes transformers and filters for providing high voltage and low voltage timing levels. Power is turned on by the switch 59 on the front panel of UC 26, indicated by the UC line to Section 1. Section 1 receives a signal from an interlock Section 4 which monitors the physical interlocks to each of the modules shown in FIG. 2. Physical removal of any of the modules shown in FIG. 2 will cause an appropriate signal to be provided by the interlock circuitry to Section 1, thereby causing a disruption in the high voltage supply output for Section 1. Thus, as a safety feature, the absence of modules or the removal of modules from the module power circuit panel will automatically cause removal of high power from the back plane area of the power supply. The low voltage timing signals, however, are not removed, the function of the interlocks being only to prevent high voltage signals from being present along various areas inside the power supply modules. Thus, the low voltage timing signals remain connected to the main power supply and continue to provide low voltage timing signals to all of the appropriate logic circuitry for monitoring the moment at which the modules are reconnected to the power supply and thus restore power levels are restored. Low voltage logic signals will also be removed, after a short time interval. Section 5 is coupled to the high voltage area of Section 1 for providing the high voltage supply regulation to the modules. Appropriate clock circuitry is provided in Section 3 for synchronizing the operations of Section 5 along with Sections 6 and 2. Section 6 provides synchronized switching capability under control of a clock for maintaining synchronism between the various logic circuits throughout the supply while Section 2 is a DC to DC converter which acts to convert the low voltage supply provided by Section 5 into the various different logic supply levels required by the system.

Figure 4A:
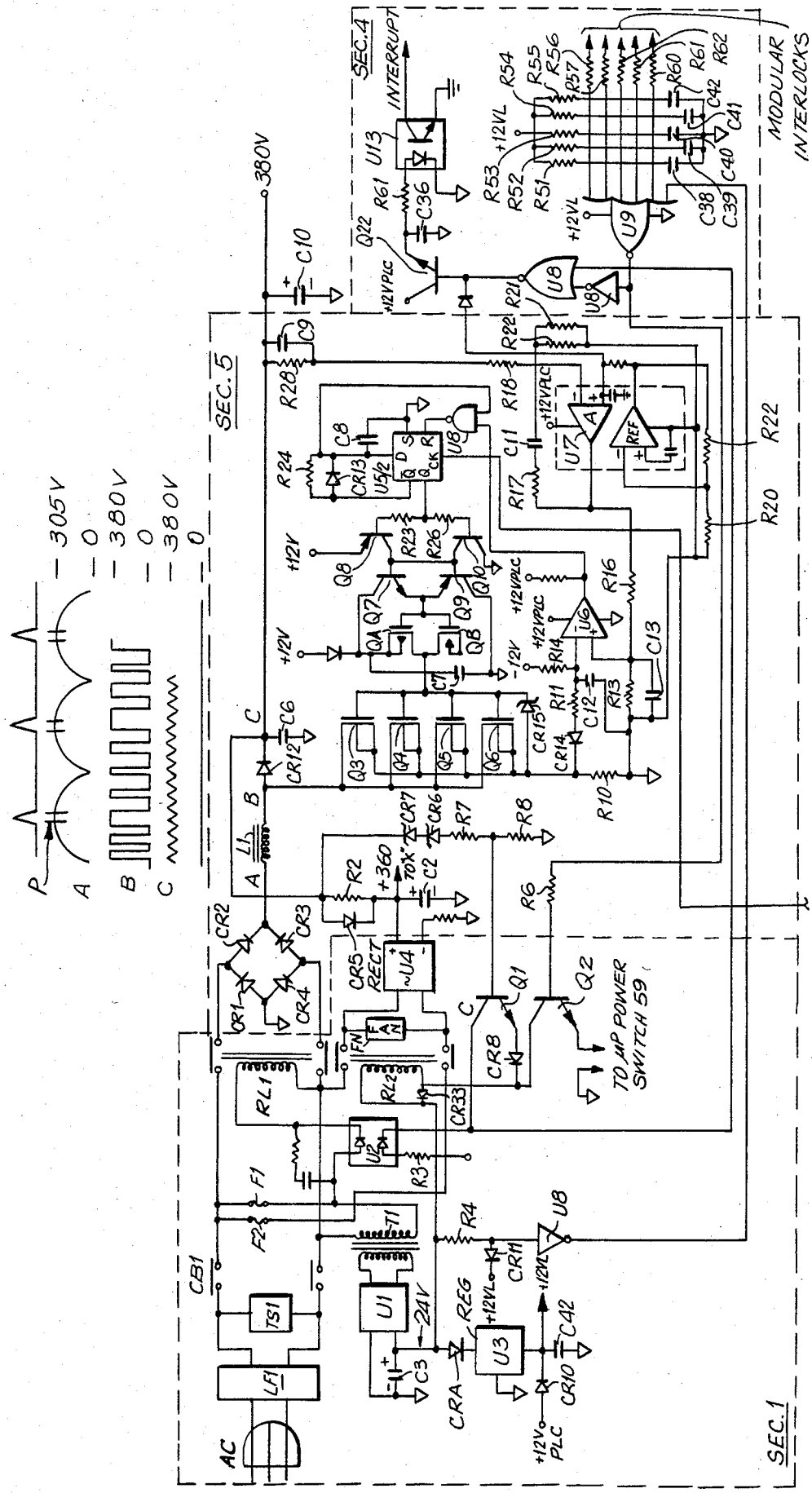
FIGS. 4A and 4B show a more detailed circuit diagram of the power line conditioner of FIG. 3.
Figure 4B:
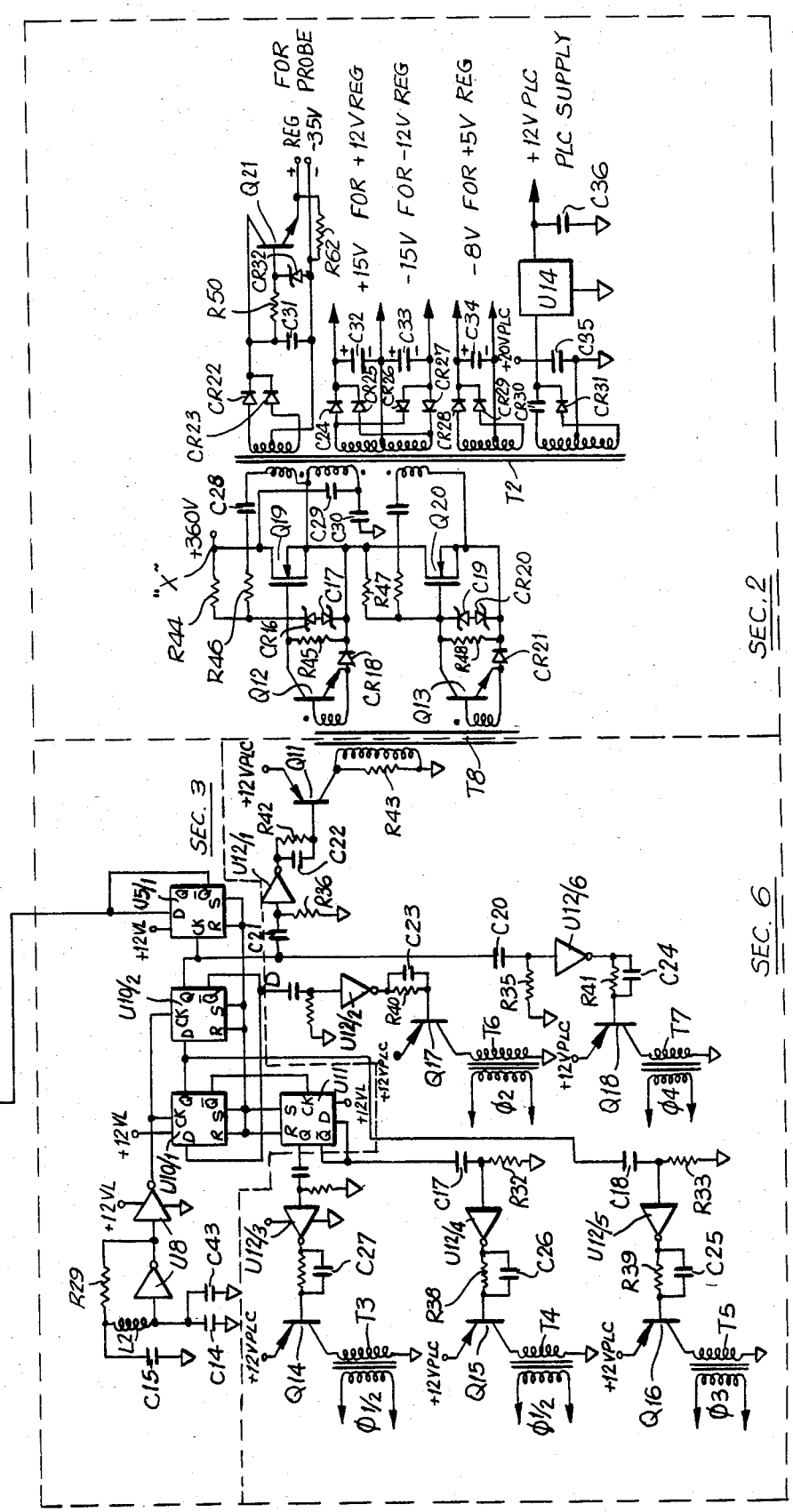

Referring now to FIGS. 4A–4B, a detailed circuit diagram of the power supply line conditioner, shown in block form in FIG. 3, is illustrated.

With reference to FIG. 4A, external power is applied from the main power supply through the line 22 to the circuit breakers CB1. The circuit breakers CB1 are mechanically linked and located on the back panel of the power supply and are used as an AC "ON/OFF" switch to provide line power to the power supply. input surge suppressor TS1 and an RFI line filter LF1 are connected across the main input line to prevent internal noise from passing through the supply to external systems. A transformer T1 is connected across the main line in series with a fuse F1 to a rectifier U1 which supplies a 24 volt output line. A regulator U3 fs coupled to the output of rectifier U1 via diode CRA and in turn provides a 12 volt supply +12VL. The diode CRA prevents reverse current flow through the regulator U3 in the event of a power line failure. The 12 and 24 volt supplies are utilized for logic levels throughout the system and remain active even when the high voltage supply is disconnected from the modules as will be described in further detail below. The 12 volt logic level maintains synchronism throughout the system by application of power to the clock circuit of Section 3 as well as the interlock logic area which enable continuous monitoring of the system without the presence of high voltage power. High voltage power may be disconnected as a result of various conditions, including removal of any one of more or the modules 30, 32, 34, 36, 38, or 26, or PLC 20 that constitute the components of the main power supply. Thus, should any of the modules be removed, thereby allowing access to the internal workings of the supply, the high voltage level is removed but the logic levels are maintained, thereby providing a significant safety advantage in the utilization of a system for this purpose, and for insuring synchronism on start-up.

Main supply is then provided to relay RL1, which is energized in accordance with activation of the optocoupling circuit U2, which is in turn energized by appropriate switching through transistors Q1 and Q2. Relay RL2 is activated by the +24 volt supply through the transistor Q2. A second fuse F2 is coupled to the contacts of relay circuit RL2. The emitter circuit of transistor Q2 is connected to the switch 59 shown on the front panel of UC module 26 (FIG. 2), and will allow the transistors Q1 and Q2 to provide appropriate energization to U2 and in turn to relays RL1 and RL2 if the interlock circuitry provided in Section 4 indicates that no interlocks have been disconnected. Each of the interlocks result from a plurality of electric loops which are formed by physical connection to each of the modules shown in FIG. 2 by means of a series of inputs of logic levels to the NOR gate U9 shown within the section 4. Removal of any one of the modules will cause the appropriate logic level to be applied to the input of U9 which will in turn prevent transistor Q2 from conducting, and in turn prevent relays RL1 and RL2 from closing. In this event, high voltage supply will be blocked or removed from all of the main power supplies of each of the modules and line voltage only remains, confined to only one area of one circuit board constituting the portion of FIG. 4A identified as Section 1. Since this is a physically locatable area that can be relatively restricted from access, by virtue of its location in only one area of the PLC circuit board, safety with high voltage levels is thus assured. When the power switch 59, from the UC 26 panel, is closed, transistors Q1 and Q2 allow energization of relay RL2, which in turn applies power to a cooling fan FN located within the power supply housing and to the rectifier circuit U4 which provides high DC voltage at the junction of resistor R2 and C2 capacitor. Thus, when relay RL1 and RL2 contacts close, high voltage will exist within the various modules of the supply.

Upon power on, i.e. energization of relay RL2, the 220 volt source is rectified by U4 to cause the capacitor C2 to charge toward the peak value of about 305 volts. This causes the voltages across capacitor C6 and main capacitor C10 to also charge toward 305 volts, by way of resistor R2. At the same time, the signal power level from the junction of R2/C2 is applied to Section 2 at point X. Section 2 is a DC to DC converter whose sole purpose is to provide logic power for all the logic circuitry internal to the supply. The DC level signal is chopped by the Q19/Q20 network, stepped down through T2 and rectified, smoothed and regulated to provide a −35 volt probe supply, a ±15 volt supply, a +8 volt supply, and a separate +15 volt supply for regulator U14, the output of which is a further +12 volt supply for the PLC logic, identified as +12 VPLC. The 12 VPLC level is applied, in Section 1, through CR10 to the output of U3 to provide the +12 volt logic levels under normal conditions. Thus, should there be a disruption in the power source, the capacitor C42 is still charged via the regulator U3 and the +12 VPLC signal remains so that all of the control functions remain as long as there is main power available.

The clock circuit of Section 3 as shown in FIG. 4B, is designed to turn on in a self oscillatory mode and it will oscillate at a stable frequency in accordance with the resonant characteristics of the circuit formed by U8, L2, G15, C14 and C43. As soon as the +12 volt PLC supply is up, the synchronizing circuitry of Section 6 is activated, which then locks the switching network Q19/Q20 into sync at a desired frequency. For this purpose the oscillatory signals are applied through U10/2 to a pulse forming network formed by C21, R36, and U12, to Q11, to drive the primary of transformer T8, the secondary side of which is coupled to two transistors Q12 and Q13, and which will pull the gates of transistors Q19 and Q20 to ground in order to cause commutation at a frequency higher than the normal resonant frequency of the switching network. The −35 volt supply of Section 2 is used for probing the ion beam to determine the ion beam current and includes, on the secondary side of the transformer T2, the transistor Q21 and voltage reference diode CR32. R62 is connected between the emitter of Q21 and the negative side of the diode CR32 to provide a minimum current to maintain voltage regulation. Thus, a potential is supplied to the ion probe which is placed in the beam path to test the beam current. The negative lead to the probe, and the positive lead to the beam power module 34 where it is monitored as a current. This current, when applied across a resistor in the beam module 34, develops a voltage proportional to the current in the probe for monitoring or display.

The individual power modules are locked into sync by the clock signals supplied from the PLC Section 3. The clock of Section 3 is supplied from the 12 volt supply 12VL derived from Section 1 and includes an inductor L2, and a second capacitor C14 to trim the resonant frequency. Although the frequency is not critical, it is preferably maintained within a relatively narrow range. The clock runs when the +12 volt logic +12VL is available, or any time the unit is plugged in and ready for operation. When the power switch 59 is closed and the 12 VPLC voltage comes up it powers the rest of the circuitry. The oscillator of Section 3 sets the frequency and then a divide chain produces 4 phases of the clock to provide 4 pulse edges. This runs continuously to preserve sync. From U5/1, a divide by 2 count provides signals to Section 5. Another divide by 2 operation is provided from Q of U10/1 to the clock input of U11 to divide down the basic frequency to a ½ frequency to supply clock signals to the power supply modules that need to operate at a ½ frequency, such as the filament drivers. Those two sections are identifed as 01/2 and negated 01/2.

Referring again to Section 1, when the high voltage at the 380 volt output is available, it is fed back from point C via diode CR5 to the 360 volt node at the junction of C2 and R2, so that the voltage at this point will actually be 380 volts minus the diode drop during normal operation. The purpose of this is to guarantee that should power fail (for instance, fuses blow in the line which supply the power to the relay and to the transformer, thus removing the logic supply), there is no immediate loss of logic power while 380 volts is still available due to the charges stored on capacitors C6 and C10. This avoids damage which may result from loss of logic power before high voltage is removed.

As noted above in the interlock description, if one of the modules is missing it creates a signal which removes current from Q2 and shuts off the relays RL1 and RL2. As a result, a signal is sent back to the microprocessor control unit UC 26, through section 4 of NOR gate U8, transistor Q22, and optoisolator U13. This signal interrupts the microprocessor, which turns off the modular power supplies.

Thus, the system senses that there has been an interlock broken or power removed and signals the microprocessor, which then takes appropriate actions to remove module power before the logic power fails. If power should be reinstated after an error is detected but before the logic shuts down, the microprocessor unit UC 26 will retain an indication that a shut down was initiated and display an error condition. The error condition will remain latched to indicate a malfunction. Only when the condition degrades the performance of the system, or supplies a fault in the output voltages, is the error condition generated.

Referring to Section 5 of FIG. 4A, on power up, after the rectified output voltage of U4 rises to provide a voltage across filter capacitor C2 of about 270 volts, the circuit comprised of diodes CR6 and CR7, and resistors R7 and R8 which form a voltage divider network, supplies a current to the base of Q1 which allows it to conduct. When Q1 conducts and if Q2 is conducting, then current will be drawn from the photodiode of U2, which then turns on the main relay RL1. Without this delay, a very high current, on the order of several hundred or even thousands of amperes, could pass through these components. The inductance of L1 would collapse and the resulting current, through CR12 to the capacitor C10, would probably destroy one or more components. It would also produce an overvoltage at the output point which could destroy other devices at the output of the supply. Thus, the present invention provides a method to turn power on without a large current transient. In essence, Q1 provides delayed signal turn on for the main power to the circuitry. The Q1 signal also is coupled to the microprocessor unit UC 26. Upon turn on, if the microprocessor unit UC 26 is going through a self test routine, it will acknowledge that there has been an interrupt and will wait until the interrupt is removed before starting normal operation. When the interrupt is removed, the microprocessor UC 26 assumes that all the power supplies have proper input voltages.

Returning again to the upper portion of Section 1, upon closing the main relay RL1, power is applied to the bridge circuit CR1/CR2/CR3/CR4. Looking at points A and B of L1, the signal at A represents essentially 120 hertz rectified but not filtered AC line power, the peak of which is about 305 volts. At side B of the inductor L1, the waveform B indicated represents switching at about 380 volts. The resulting signal at point C will have a slight amount of ripple. When from U5/1, Section 6, a clock signal is applied to the clock input of the U5/2 Q output of U5/2 switches low and the Q output switches high. With U5/2 Q high, transistors Q8 and Q7 turn off, and Q9 and Q10 turn on. This applies a negative voltage to the gates of QA and QB, turning QA and QB off. As a result, the gate voltage on FETs Q3 through Q6 is pulled to approximately plus 11 to 12 volts. This in turn drives Q3–Q6 into saturation which holds point B at ground potential. Now current through L1 will increase at a rate determined by the formula $V = L\,di/dt$, with $di$ increasing in accordance with the voltage between A and B. That current is sensed in R10 and through a comparator U6 activates the reset of U5/2. Upon resetting U5/2, the U5/2 Q goes low, turns off Q9 and Q10, and turns on Q7 and Q8, applying a positive voltage to the gates QA and QB, turning QA off and QB on, thus driving down the gate of the four FETs and turning them off, thereby removing the current sink from node B. Very rapidly, and limited only by parasitic capacitances, the voltage at node B will rise until the current flows through CR12. The current flows into C6 and C10 and to the 380 volt loads. The length of time point B is high compared to the length of time it is low will change, depending on the voltage at A and the voltage across the capacitors C10 and C6. As a result, the voltage at C is maintained at a voltage above the peak voltage at A. This type of converter, termed a boost converter, functions to produce a DC level at a voltage higher than the input level. A unique distinction of the present invention is that the input voltage is not a DC level, but instead is a rectified AC sinusoid, depicted by the waveform shown as A in FIG. 4A.

In a conventional power supply, a bridge rectifier rectifies line voltage, and stores a charge directly in a capacitor. During the peak of the rectified signal, i.e., interval P on A, the rectifiers conduct current. During the rest of the cycle, no current will flow due to the characteristics of the diode rectifiers. As a result, all of the current normally would flow during the short interval marked as P on top of the signal A. If the interval is 1/10 of the total time for one half cycle, then the current that flows during that time will be 10 times the average current. The current spikes that would result are extremely large and produce a great amount of EMI and RFI. It is also inefficient and difficult to filter such large current spikes with a line filter.

The circuit of Section 5, described above, provides a method for causing the current to approximately follow the voltage. The dotted line on the voltage waveform A approximates the expected current waveform. It is slightly flat on top due to the nature of the circuitry, but rises with the rising edge and falls with the falling edge of each half cycle. Thus, this current is smoother and contains less high frequency energy than conventional peak rectification.

Referring now to Section 6, FIG. 4B, a series of pulse outputs at intervals of 500 nanoseconds generate synchronizing clock signals for each of the five power supply modules. The synchronizing clock signals control the phase in each of the five modules. The clock signals are intentionally staggered so that the leading edge of each clock signal has a different phase. The different phased clock signals then switch each of the different modules at staggered intervals, thus reducing current and voltage transients.

As an example, the output of the Q terminal of the flipflop U11 of Section 6 passes through a differentiating RC circuit C17 and R32, and triggers U12/4. That output pulse then is fed to resistor R38 and capacitor C26, and to the base of transistor Q15, resulting in a positive current pulse in the primary of T4. At the conclusion of that pulse, the signal goes back to ground or slightly below, in order to reset the magnetizing current in the transformer core. Thus, the result is a pulse that goes to plus 12 volts, and then goes negative by a few tenths of a volt. This pulse repeats in accordance with the clock frequency. The remaining units connected to transformers T3, T5, T6 and T7 operate similarly.

The turns ratio of these transformers is selected to force the secondary to swing below zero and above 12 volts. As a result, the signal that goes to the clock on the power supply board (FIG. 6) exceeds the supply voltage on that board so there are no noise problems during the transitions in each module. The sync signal is clipped and a resistor R3 (FIG. 6) is used to prevent ringing and to speed the return back to zero.

The PLC module of FIGS. 4A and 4B just described supplies all of the individual module power supplies and does all of the power conditioning for the power supply modules as well as the microprocessor modules.

The outputs from FIGS. 4A and 4B, including logic levels, high voltage supplies and clock signals, are sent to the individual power modules, exemplified in FIG. 5. The circuit of FIG. 5 is divided into two sections, the upper section noted as ANALOG and the lower as DIGITAL. Clock signals from the circuit of FIG. 4 are supplied to a pulse width modulator (PWM) U5, which will provide output switching pulses at logic levels at a rate determined by input control conditions. These switching pulses are increased in peak-to-peak excursions by a level shifter (LS) U10 which in turn provides switching signals to a gating circuit TB. The gating circuit thus switches the power voltage supplied thereto in accordance with the switching pulse rate for providing high energy switching signals. The switching signals are fed across a snubber circuit U13 which serves to damp ringing effects, and thence to the load via a transformer circuit TD. Control is maintained by virtue of two feedback loops, termed a fast loop FL and a slow loop SL. The fast loop provides a direct feedback connection to the pulse width modulator U5, while the slow loop provides monitored conditions to a multiplexer U2, which in turn applies the signals to an analog-to-digital converter U6. This unit places digital signals representative of monitored conditions onto data lines MDI, which in turn sends the signals to the microprocessor controller UC 26. In response to keyboard or other input conditions, the UC 26 can transmit digital control signals to the module along data lines MDO to the digital-to-analog converter U3 and to the logic select circuit U1. Upon selection by virtue of the data applied to U1, the digital-to-analog control circuit applies a corresponding analog signal to the pulse width modulator U5 to affect the switching rate and thus ultimately the output conditions, and to MUX U2 for feedback to the UC 26 through analog to digital converter U6. Reset conditions are generated by application of signals along the RESET line of PWM U5. Reset can occur for a number of reasons, including or resulting in microprocessor-originated signals, sent along MDO, interpreted by logic control U1, and sent to the reset input of U5.

The status of the power module, including reset conditions, is sensed by the read register U7 and converted into a digital signal for transmission to UC 26 along lines MDI.

The circuitry of FIG. 5. is shown in greater detail in FIG. 6. FIG. 6 thus, with the exception of FIG. 6C, represents the portion of the circuits common to all five power supplies. As described in FIG. 5, there are two sections, a digital section and an analog section. The digital section, shown in FIGS. 6D and 6E, controls the module power supply from the microprocessor module UC 26. Status lines monitoring power supply conditions go through register U7, which latches data to be read by the microprocessor, which in turn serves to transmit data to the microprocessor UC along lines MDI providing system status. An analog-to-digital converter U6 measures parameters from the analog section, digitizes same and sends them to the microprocessor UC along data lines MDI for monitoring voltages and currents. A multiplexer U2 receives the various analog signals and multiplexes them to the input of the analog-to-digital converter U6. A digital-to-analog converter U3 receives command signals from the microprocessor controller along lines MDO and converts these to voltages for the analog section through amplifier LM308, to pin 1 of U5, to control or to program the voltage or current required for this module. Logic unit U1 controls the operating status of the other units U6, U2 and U3. Various regulators and filters shown produce the local voltages required to run the logic circuitry.

Figure 6A:
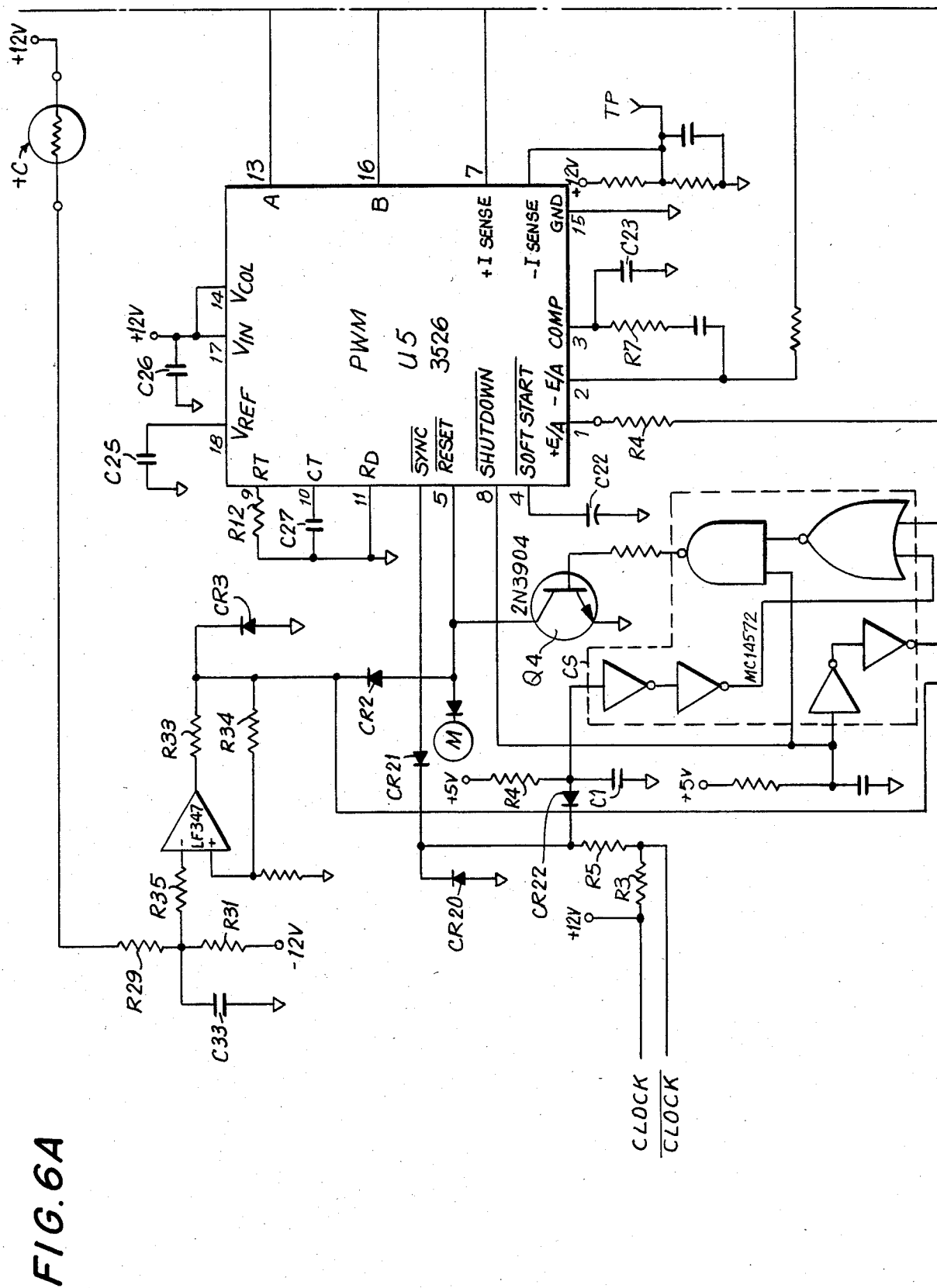
Figure 6B:
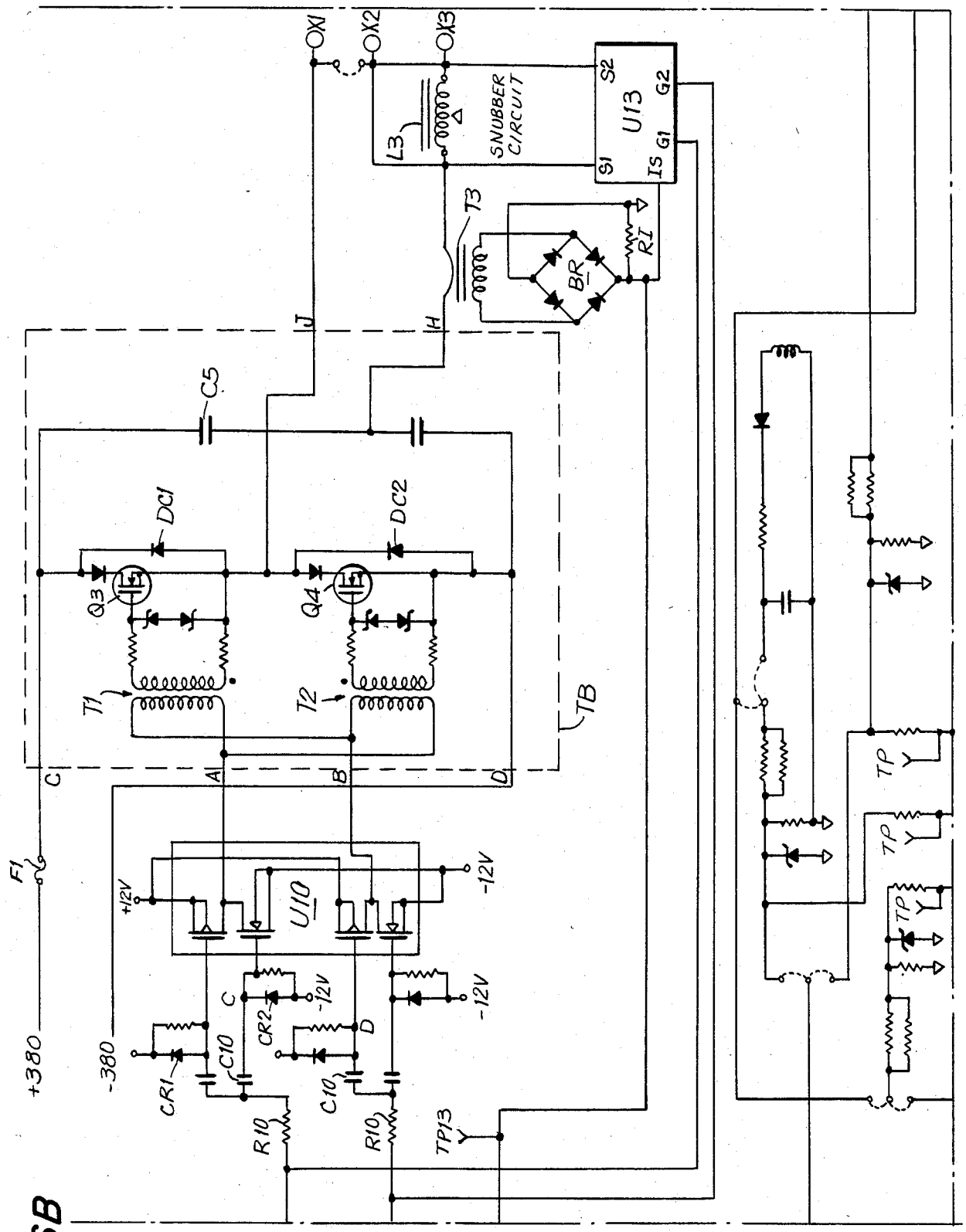
Figure 6C:
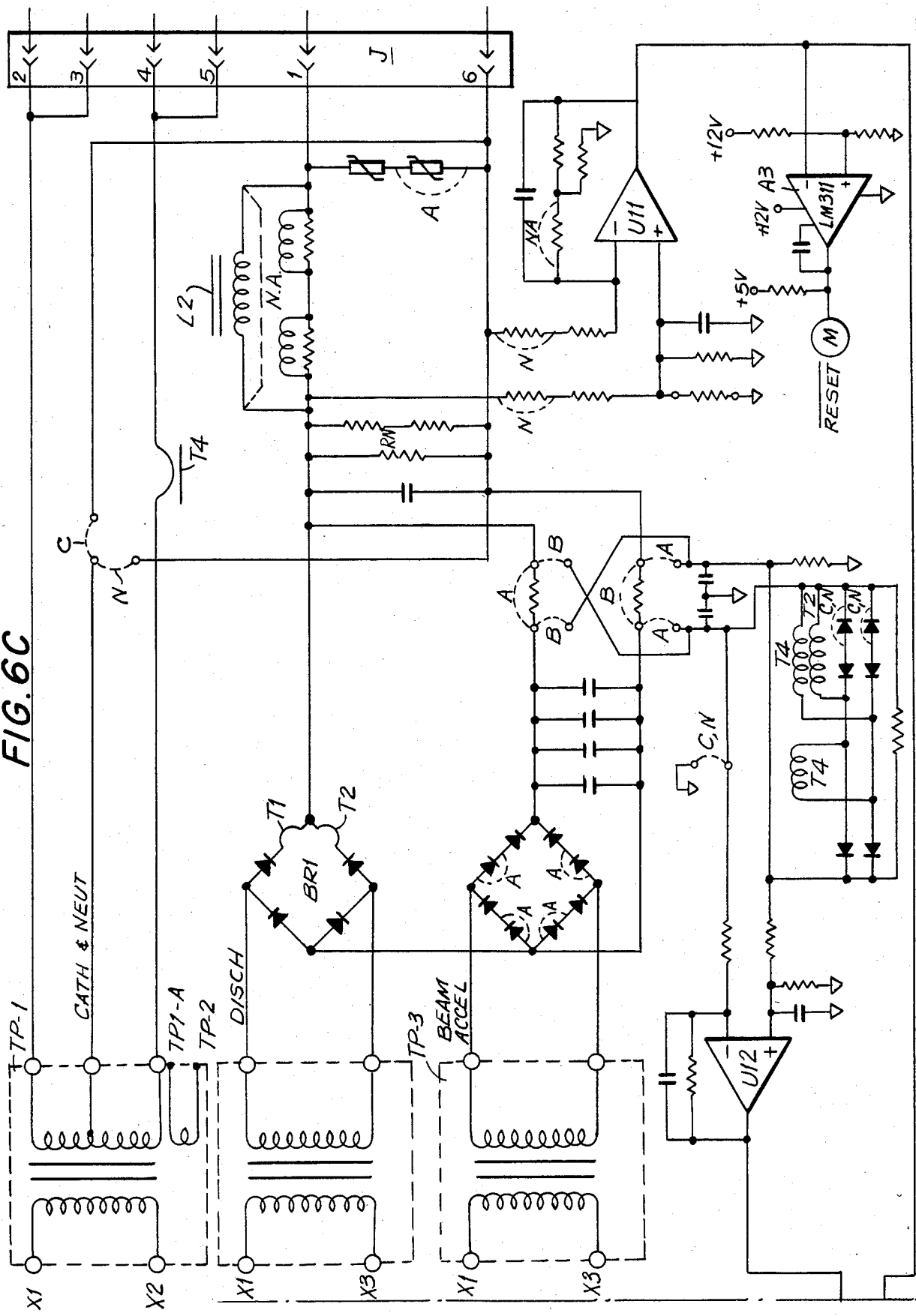
Figure 6D:
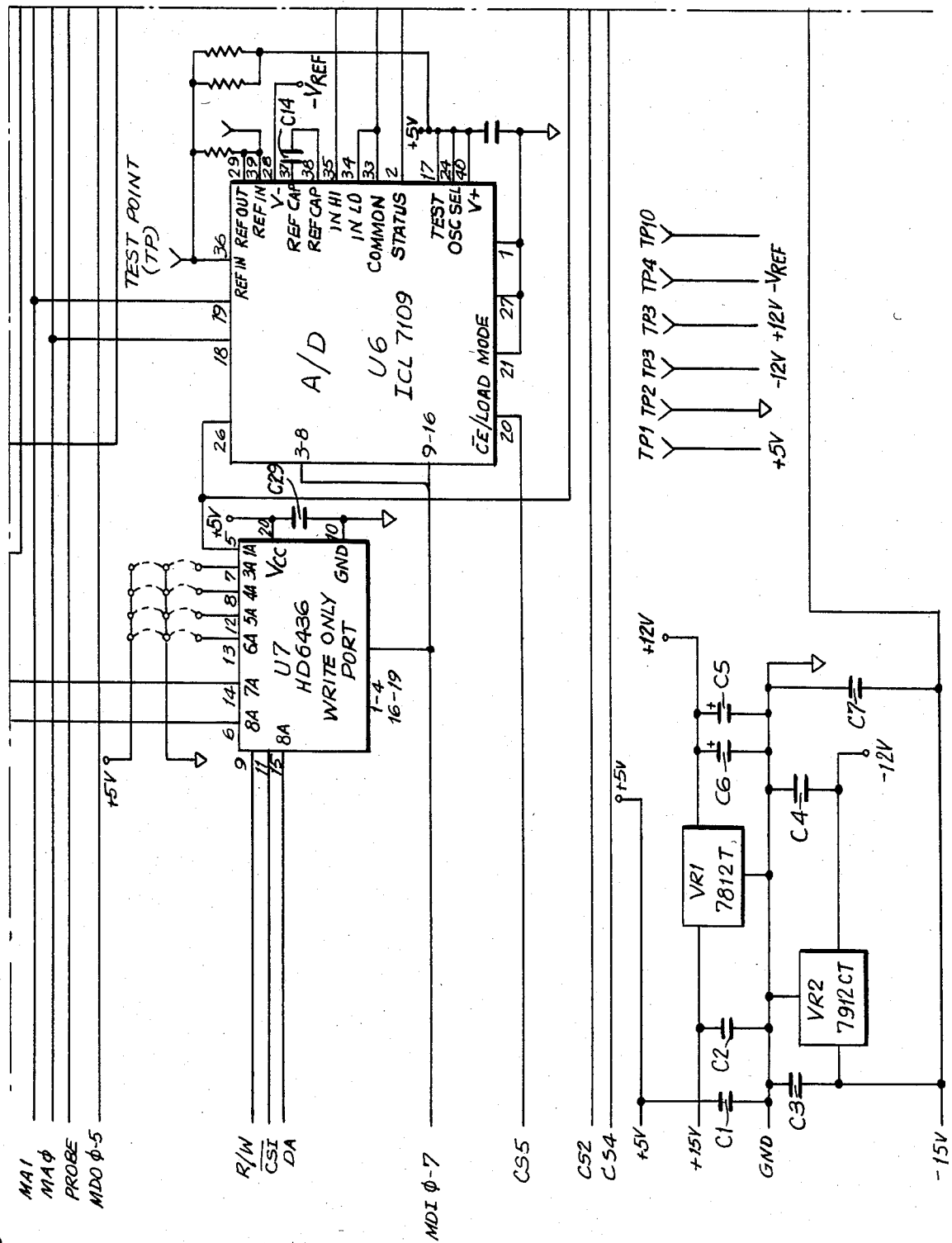
Figure 6E:
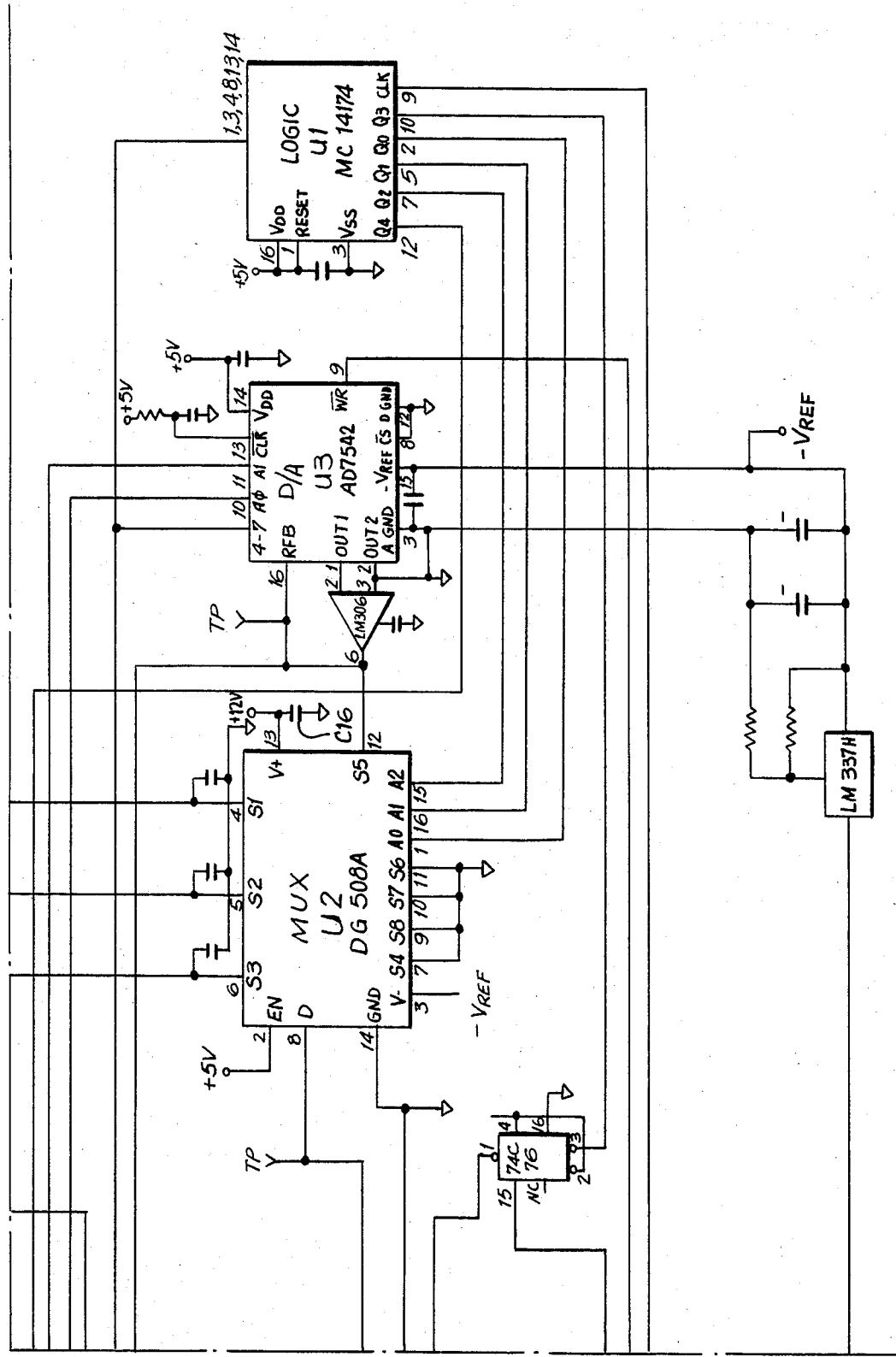

The analog section, shown in FIGS. 6A–6C includes a standard pulse width modulator chip U5, circuitry for sensing temperature, and fault detection circuitry CS. Chip U5, pin 1, receives the control voltage output of the digital-to-analog converter U3. A shut down signal comes from the digital section, pin 12 of U1, and pulls down the reset line, pin 5 of U5, to disable the system so that no output is generated regardless of other conditions. This signal is applied any time zero voltage and current are to be produced. The reset line can also be activated by the temperature monitor TC, through LF347, to pin 5, in response to temperature conditions. Any reset is also signalled to the microprocessor controller through pin 6 of U7, and out the MDI lines. The output of U5, from pins 13 and 16, is applied to a level shifting circuit U10 which tracks the plus 12 and minus 12 voltage levels of the system supplied so that a signal is produced to a pair of gate transformers T1/T2 to drive the switching networks Q3/Q4.

The purpose of the level shifter is to take the pulse output from pulse width modulator U5 and convert those pulses from an output level of 0 to +12 volts to an output level that swings from −12 to +12 volts. A further purpose is to maintain fast edges and to boost the current output capability in order to drive the gate transformers in section TB. It is also possible that large voltage and current transients may occur in section TB. The level shifter is used to limit any unwanted feedback to pins 13 or 16 of U5, thereby preventing premature switching of pulse width modulator chip U5.

The level shifter is composed of U10 and its associated circuitry shown in FIG. 6B. Because there are two identical circuits in this level shifter, only the top one will be explained. The operation of the lower one is identical to that of the top circuit except for the signal source. C10 and R12 form a biasing network to maintain a positive voltage at the gate of QA. C11 and R13 form a similar network to maintain a negative voltage at the gate of QB. CR1 and CR2 serve to clamp the networks to keep the biasing voltage at the gates of QA and QB. When the signal at pin 13 of U5 is at 0 volts, QA will be biased on and conduct current while QB will be biased off and will not conduct. When the signal at pin 13 of U5 is at +12 volts, QB will be biased on and conduct current while QA will be biased off and will not conduct. Because QA is connected to +12 volts and QB is connected to −12 volts, the voltage swing at output A will be 24 volts (from −12 to +12). Thus a level shift has been obtained. This circuit allows the unique advantage of isolating U5 from the large current and voltage spikes of the gate drive transformers t1 and t2 and providing a voltage to current ratio improvement (by using a 24 volt swing instead of a 12 volt swing) at the same time.

The 24 volt swing signals are then coupled to the section TB where they are applied to gate drive transformers T1 and T2, these transformers providing isolation for the gate drive on the FET transistors Q3,Q4. In this configuration, only one FET will be on at any time. The power, for example, 380 volts derived from the power conditioner PLC, FIG. 4, is applied between lines labeled 380+ and 380−. It will be understood that other versions may be employed and that the operating concept of alternate gate switching remains the same. The output of this section TB is coupled through inductor L3 and the primary of current transformer T3 to output terminals X1 and X3, with the snubber circuit U13 being connected to inductor L3. This circuit is described in detail in conjunction with FIG. 7 hereinafter. When the inductor L3 is not used, the output is taken between terminals X1 and X2.

FIGS. 6 A–E show the composite schematic of the module supply with legends on FIGS. 6B and 6C labeled for each output connection X1, X2 and X3 indicating connection to those individually different sections of the module units which are unique to the particular supply. It will be understood that the common circuits are fully duplicated for each module supply, the composite shown here being for ease of illustration. There are five power supplies, labeled C for cathode, D for discharge, B for beam, A for accelerator, and N for neutralizer. The dotted jumpers are shown to indicate the particular connections to be made for each respective supply. Because this is a modular system, any one of those modules can be removed and another module plugged in. Thus, the invention is not limited to the five supplies shown. For instance, there are several ways to implement a cathode supply; there are several ways to implement a neutralizer supply, and so on. The design of the beam supply or the accelerator supply may also be varied, and other variations are possible. In addition, other module supplies may be added, or subtracted, so that the invention need not be limited to five supplies.

FIG. 6C shows all of the individual sections unique to each supply. The cathode and neutralizer have one configuration, the beam and accelerator have a second configuration and the discharge unit a third configuration. The remainder of the circuit is the same, and is designed to be used with each of the unique sections, on a separate circuit board employed for each module. The terminals designated with the X legends are the interconnect points as described above.

The switching signal is thus applied to the primary side of the transformer TP, providing a signal to switch between two levels on the secondary side.

Thus, for cathode and neutralizer, AC filament current is derived from TP-1 and output across terminals 1, 2, 3, 4 and 5 at connector J. For discharge, TP-2, bridge rectification and a filtering network provide power across terminals 5 and 6. For beam and accelerator, TP-3, bridge rectification and a filtering network provide power across terminals 5 and 6.

In the case of the beam and accelerator, with respect to polarity, it should be noted that the beam supply is a positive supply while the accelerator supply is a negative supply. In order to get a positive output, the jumpers SC are set one way for the beam module and the leads are reversed for the accelerator module such that the output is still positive.

Control of the modules is achieved by the use of two feedback loops. The first is a fast loop which comes back directly to the pulse width modulator U5, pin 2, and instantaneously affects the voltage or current parameters presently being controlled. The fast loop input is a target value and U5 tries to match the target. The slow loop is through the microprocessor. The microprocessor reads the actual voltage and adjusts the target to correct errors. Thus, quick variations will be compensated by the fast loop trying to match the target, and longer variations will be corrected by the microprocessor. Since the microprocessor is not fast enough to meet voltage and current requirements at a high frequency, and since the loop gain is such that the low sample rate by the microprocessor may cause instabilities, the fast loop is provided. Thus, the fast loop or hardware loop provides short-term stability for the power supplies. Long-term stability is achieved by the software loop since the voltage that is being output has been corrected for any errors in the system. Because of this use of a dual closed loop system, much greater accuracy is maintained in the voltage outputs. The fast loop is an immediate response based on conditions that occur at the time. The slow loop is a software control loop which makes a finer adjustment to the desired voltage or current conditions.

The cathode and neutralizer current is sensed for feedback control through the T4 primary as seen at the connector in the upper right-hand corner of FIG. 6C. The current in the secondary of T4 then goes through a diode network and to U12. U12 provides a signal to the input S1 on the multiplexer U2 to form the slow loop and to pin 1 of U5 to form the fast loop. Thus, S1 acts as the current sense for the cathode and neutralizer circuits. The discharge circuits use T1 and T2, the primaries of which are in the bridge circuit BR1, and the secondaries of which are in the diode network at the input to U12, to derive a DC output current proportional to the DC current flowing through inductor L2. The result is to allow reading DC with two AC conductors. Beam and accelerator monitored currents are also provided through U12.

Secondary TP-1A senses the presence of voltage at the cathode and neutralizer supplies, and is sent out to the monitor port S2. Voltages are sensed at the output of all DC supplies, and applied to the input of operational amplifier U11. U11 is connected directly across the output lines and it measures differentially the accelerator, the beam, or the discharge voltages. The output of U11 is then applied to the multiplexer U2, and also to pin 1 of U5. In the discharge, beam and accelerizer modules current is monitored and voltage is controlled. In the cathode and neutralizer modules current is controlled and voltage is monitored.

Emission current for the neutralizer module is monitored by the average current flow on the center tap on the neutralizer transformer TP-1 secondary, which is coupled through low-valued resistors RN, across which a voltage proportional to the current is developed. This voltage is passed through U11 for detection as described above.

It should be noted that U5 responds to two classes of errors. One classes of errors causes reset of U5, by applying a signal to pin 5 of U5. The other causes a shutdown signal to appear on pin 8 of U5, which is transmitted to the microprocessor. The shutdown signal also is applied, indirectly, to pin 5 of U5, causing reset as well.

Shutdown results by U5 sensing excessive transformer primary currents, caused, e.g., by output shorts, load circuitry malfunction, etc. The other category causing reset includes shut down (the first class), thermal overload (which is sent to the microprocessor via pin 6 of U7), sync clock failure, overvoltage and microprocessor-directed shutdown from pin 12 of U1. The circuit formed by comparator A3 is an overvoltage protection circuit, applying a reset through point M to pin 5 of U5, in the event of overvoltage.

The clock signals, described in conjunction with FIG. 4B, come into each module, one clock signal for each module, on the left side of FIG. 6A, into resistor R3, one end of which is connected to the plus 12 volt supply to synchronize the pulse width modulator with the system clock. Because the signal has an amplitude greater than 12 volts, it will force the voltage at the junction of the three diodes CR20, CR21, CR22 to go alternately above 12 volts and below zero. The diodes will isolate any voltage higher than +12 volts from the remaining circuit and also prevent this point from going below ground. The resistor R3 limits current to the diodes. Resistor R5, capacitor C1 and diode CR22 form a sampling network, sensing the presence of a clock signal. Upon the loss of the sync or clock signal, the voltage across capacitor C1 will go high, pulling down the reset line to U5 and turning off that module. The microprocesor detects the reset by monitoring a loss in output in voltage and current via the previously described feedback loops.

Two start-up test operations are provided. The first is a system test. In this test, the UC 26 sends a digital representation of a known voltage to U3, FIG. 6E, along lines MDO 0-7. U3 converts this signal to an analog signal which is buffered through LM308. The resulting DC reference voltage is supplied to pin 12 of U2, and in turn is applied to pin 35 of U6, where it is converted back to a digital signal. This signal is sent along lines MDI back to the UC, where it is compared to the original transmitted value for error detection. The second is a calibration test. The calibration test reads the actual voltages present at the sensors in each module, read at pins 4, 5, and 6 of U2, when the module is known to be set at zero voltage and zero current. The signals are passed through U2 to U6 and then to the microprocessor on lines MDI. Any difference of the read values from zero levels is the offset error. The offset error values are then stored in the microprocessor memory. When operating, the actual readings are then corrected by adding or subtracting the respective offsets. This avoids the conventional need of using correcting potentiometers or the like to perform zero adjustments each time the device is turned on.

Across the inductor L3, FIG. 6B, is a snubber circuit U13, shown in detail in FIG. 7. Each of the modules has a current transformer T3 which senses the current applied to the output transformers TP-1, TP-2, and TP-3. This current is proportional to the waveform shown in FIG. 7C. The output of the current transformer T3 is rectified by a bridge rectifier BR and is fed back to the pulse width modulator, pin 7 of U5 (FIG. 6A).

The rectifier output is developed across resistor RI and applied from terminal IS to an input filter consisting of a resistor R5 and a capacitor C5 (FIG. 7). The common node of the resistor R5 and capacitor C5 is connected to the inverting input of a comparator CM1. The non-inverting input is used to set up a voltage reference level above ground. When the inverting input is at a voltage below that level, the output at pin 7 will be high. When the inverting input is above the reference level, then the output at pin 7 will be held low. The voltage waveform at point IS is shown in FIG. 7A. The output of the rectifier BR contains only positive-going waveforms. Since the reference level F1 in FIG. 7A is set above ground, switching will occur at each crossing of the voltage through this reference level.

When the output of comparator CM1 goes high, the flip-flop U15/1 pin Q goes high and pin Q goes low. When Q goes high, a positive signal appears at the output of the unity gain amplifier A1 composed of two transistors, a pnp transistor Q1 and an npn transistor Q2, driving a gate of FET Q3, which turns on. That applies a voltage across transformer T5. The voltage on the secondary applied to the gates of Q5, Q6 turns the two FETs Q5, Q6 on. The Zener diodes Z1, Z2 are connected back to back across the secondary of T5 to prevent the voltage spikes from rising above the Zener level. The FETs Q5 and Q6 represent a switch that can be electrically closed and opened. When closed, it allows any voltage changes across the inductor labeled L3, connected between the terminals S1 and S2, to be applied across the capacitor C7 and a resistor R7. The values of the capacitor C7 and the resistor R7 are chosen such that a critically damped circuit is formed with inductor L3 such that all of the energy in L3 at the time of closure of the switch will be rapidly absorbed by R7. Because the circuit is critically damped, absorption of energy will occur at the maximum speed without overshoot.

To turn the FET switches Q5,Q6 off, the U15/1 Q output at pin 1 is connected to a resistor R8 and a capacitor C8 which form an RC time constant and then to U15 pin 11. When the level of clock input pin 11 U15/1 rises to the clock level, it toggles Q pin 13 high and, through diode D1, pulls the reset high on pin 4 of U15/1, thus resetting the circuit. When reset the Q pin 2 of U15 goes high, and through A2 the voltage is applied to the gate of FET Q4. The Q pin 1 U15/1 then goes low and turns off FET Q3. A resistor R9 between the two FETs prevents a large current spike from flowing through the power supply during transitions. The diode D2 prevents reverse voltage from being applied to the upper FET Q3. Once pulled up part way, the FET Q3 turns off, the diode D2 blocks the voltage, and the transformer swings further positive until its clamped by the Zener diodes on the secondary side.

When the Q pin of U15/1, goes high, that in turn resets U15/2. Thus, this circuitry basically performs the function of turning on the FET switches upon zero crossing detection, and turning off the switches a fixed time later. In addition, there are two more diodes D3,D4 connected to the reset of U15/1. The anodes of D3 and D4 are respectively coupled to output pins 13 and 16 of U5 in FIG. 6. The purpose of D3 and D4 is to inhibit power dissipation when the gate drive FETs Q3/Q4 of FIG. 6B are on. Thus, as soon as the pulse width modulator U5 turns on, the signal to the nodes of diodes D3 or D4 resets U15/1, and turns it off, even if the snubbing period has not ended.

Critical damping of inductor L3 removes all unwanted energy from the system before the next energization. The FETs Q5, Q6 of FIG. 7 function as a switch that is closed when it is desired to dissipate energy in the resistor R7. As shown in FIG. 7B, transition 1 of the voltage at terminal J (FIG. 6B) occurs when the voltage rises with the pull up of FET Q3 (FIG. 6B). Transition 2 is the voltage drop that occurs when FET Q3 is opened. This transition should occur without any snubbing causing waste energy, since power is still being transferred to the load. However, after the cycle ends, ringing will continue for a long period of time, because of the high Q of the system. Ringing is not desirable since the next pulse leading edge could cause an additive high energy spike through the system, thus damaging components. Thus, this energy must be damped out as quickly as possible, in preparation for the next pulse. The transition 3 corresponds to the cross-over of its reference level of the current, as shown in FIG. 7A. The occurrence of this transition is sensed by the current transformer T3, to cause the FETs Q5, Q6 of the snubber to conduct, thereby to critically damp the circuit. If the energy represented in transition 1 is 1; the energy in transition 2, at twice the voltage, is 4; and the energy in transition 3 is 1. Thus, the total energy is essentially six times the energy of a single transition. Therefore, to snub transition 3 and not the other two can save all but a sixth of the energy that would have been lost, thereby representing a considerable improvement. The snubber of this invention dissipates only that energy necessary for one transition.

To summarize the operation of FIG. 7, as shown in FIG. 7C, when the switch Q3, FIG. 6B, turns on, the current will rise linearly or almost linearly from A to B because of the inductor L; when the switch Q3 of FIG. 6B turns off the current ramps down from B to C and will go through zero at this point. At this time the zero crossing detector of the snubber detects that condition and turns on the snubbing network. So instead of the energy continuing to oscillate, the energy is taken out of the inductor and dissipated in the resistor R7 as quickly as possible. Thus, the amount of energy shown in shaded area 2 of FIG. 7C represents the energy wasted to prevent ringing and the area shown in crosshatch represents useful energy.

Figure 8:
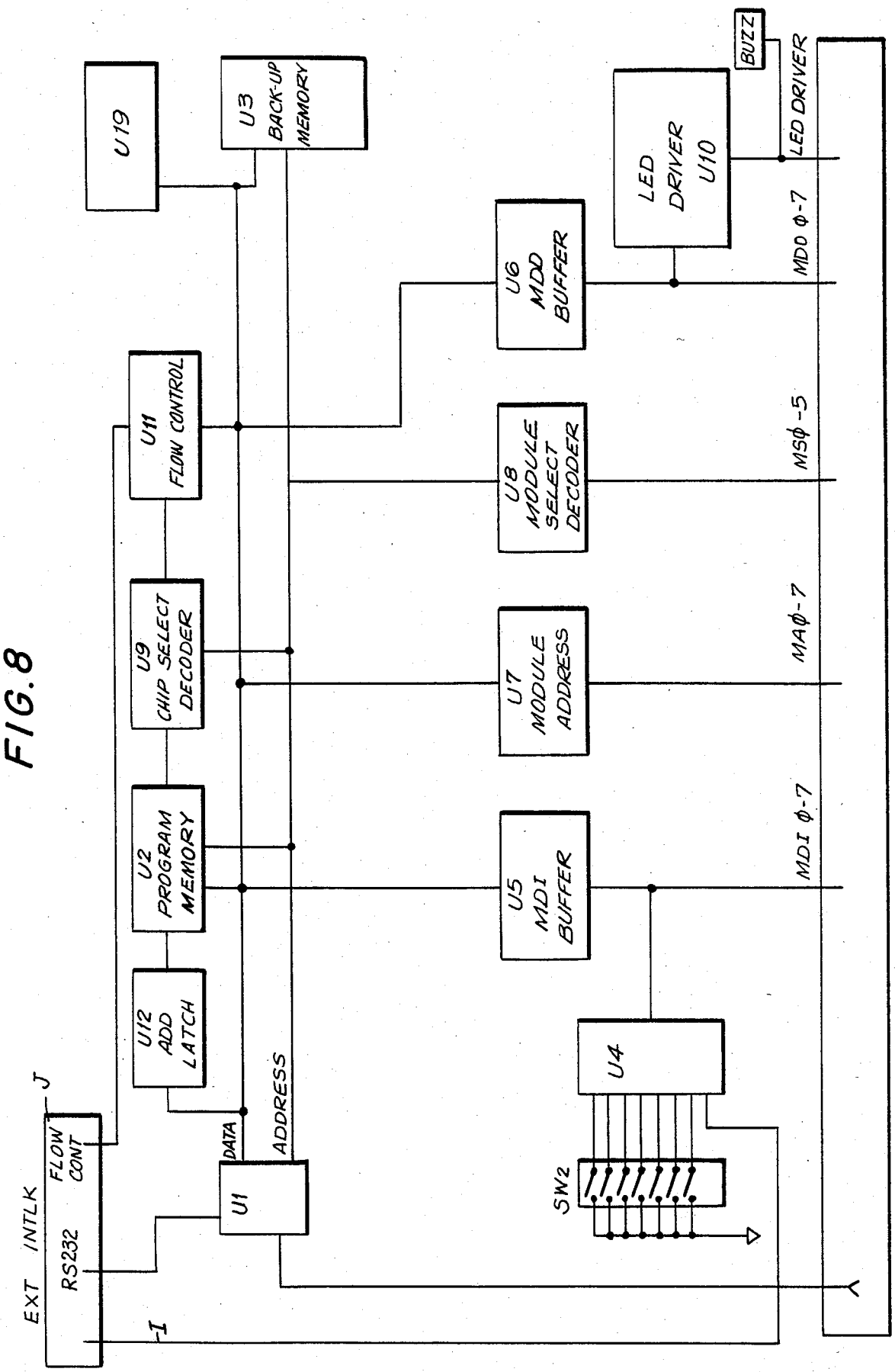
FIG. 8 is a block diagram of the control module.

FIG. 8 shows the module containing the microprocessor controller UC 26, which is the module on the far right of the panel in FIG. 2. Within the controller module there is a microprocessor chip U1 with timing provided by an external crystal and capacitors. All monitoring functions and all commands are based on this timing, which is unrelated to the timing provided in the PLC unit. All programs are contained in programmable read only memory U2 with addresses latched through latch U12. Another memory, U3, is a RAM for storing data parameters, such as the recall (RC) values, offsets, target values for displays, limits, etc. A battery pack is provided for U3 which will retain memory six months or longer. In the upper right hand corner of FIG. 8 is a timer, U19 providing timing for error delays, flashing lights and displaying flashing errors, and the like.

Input and output buffers are shown at the bottom of FIG. 8. Buffer U4 will read switch SW2, which can be configured for different modes of operation such as disabling the audio alarm, lockout manual mode, changing baud rates, etc., thus allowing users to set in desired configurations of the power supply by changing conditions under which the UC 26 will operate.

U5 is a data input buffer in which data coming in from different modules is stored.

U7 is an address latch which sends addresses to the different modules. Each module will then use that address appropriately to select which function is to be read or programmed.

Module select decoder U8 is a buffer which selects any of the five modules so that when addresses are sent out, that address be read by the module that is selected.

U6 is a data out buffer which latches the data to be sent to each module.

U10 is an LED driver for driving the LEDs on the controller module front panel.

U9 is a chip select decoder for memory mapping, decoding and internal function selection.

Flow controller latch U11 sends data out to the back panel for future interfacing with a flow controller, sending selected digital data patterns of six bits to an external connector on the back of the panel. The microprocessor U1, at a rate of five times a second, monitors every module and corrects the voltage while operating. The microprocessor U1 also reads the voltage out of every module, compares it with what should be going out, or what has been requested and, if the values are not the same, makes a correction. Input data comes in through input buffer U5, including monitored data, as well as data referring to the particular key panel that has been selected. Output data from latch U6 sets an operator-selected voltage, or sets front panel LEDs. The module select signal from U8 determines which module information goes to and comes from, and the address out of U7 indicates to that module a specific function such as a key closure or parameter change.

Thus, the microprocessor monitors and controls each module function and monitors key closure on the controller front panel or the key closure on any power supply module. A key closure on a power supply module means a change in required voltage or current. As set forth above, on closure the associated LED comes on, indicating that the system is now able to change parameters. Key closures also on the controller front panel indicate entering data, storage and recall through the panel. The microprocessor also times the duration the key is closed to determine the rate at which the settings are changed. Interface monitoring by the microprocessor also permits the external controller to change data inputs remotely, locking out the front panel keys.

The microprocessor further includes a software-controlled external interlock, settable by virtue of use selection of parameters which are monitored for interruption of power. The inputs can include anyone of several parameters such as presence of vacuum, position of targets, closure of safety gates, and so on. Interruptions caused by any of these conditions opens the external interlock on connector J, placing a logic high on line L to buffer U4, which in turn will be interpreted in the microprocessor to initiate a shutdown by virtue of a logic signal on the MDO lines to the power module (FIG. 5) to U1, which in turn provides a reset to U5 (FIG. 5) as was previously described. The microprocessor also initiates shutdown by providing data signals on MDO lines which instruct the digital-to-analog converter U3 (FIG. 5) to set all supplies to zero regardless of their setting.

Figure 9:
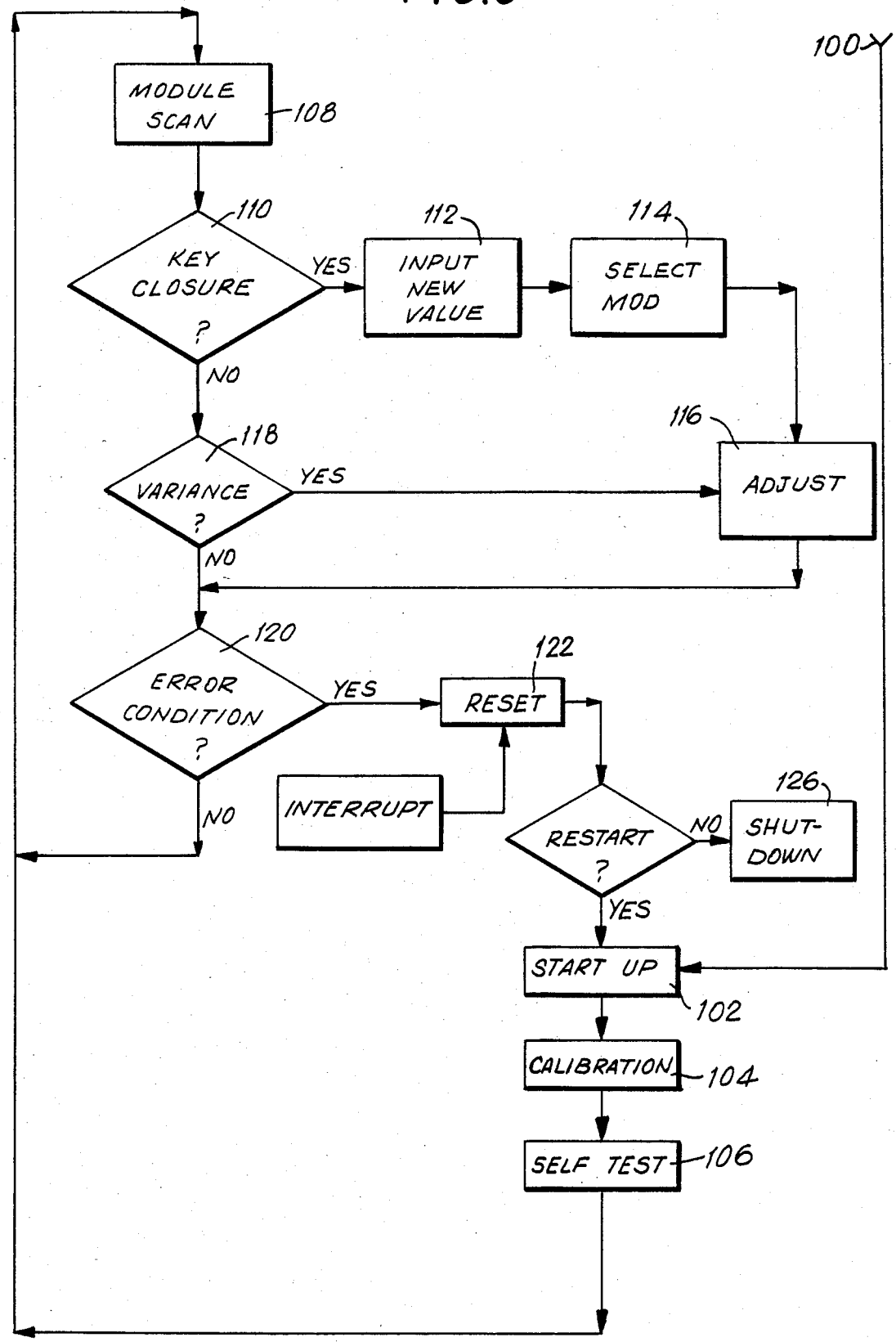
FIG. 9 is a flow chart illustrating the interrelationship between various control functions of the microprocessor of the present invention.

With reference to FIG. 9, a flow chart indicating the general sequence of operations which occur within the microprocessor control UC 26 is illustrated. The initiation or start up procedure begins at 100 and enters the start up sequence 102. Following that, the calibration check 104 is made to determine whether any offset exists in the measured values, as was previously described. Next, a self test sequence 106 is initiated for verifying correct logic circuit conditions. At this point, the scan sequence 108 begins sequencing through each of the modules for various monitor and control functions. If scan sequencing shows key closures, decision block 110 acts upon a yes indication to provide the new value, block 112, input into one of the various keyboard inputs. The appropriate module is selected, block 114, and appropriate adjustments to the output levels are made accordingly in block 116. If there is no key closure, the scan sequence then determines, at decision block 118, whether there are any variances in the monitored values. If there is a variance, a yes indication provides for appropriate adjustments in block 116. A no indication, from the decision block 118, joins with the completion of the adjustment flow from block 116. Decision block 120 acts upon interrupt conditions, and in response to no interrupt conditions, directs the flow to continue back to the scan sequence 108 wherein the operation is repeated. In response to a yes decision, reset procedures are initiated through block 122. Upon restart, and in response to a no decision, decision block 124 flows through to shut down sequencing, block 126. In response to a yes, the start up procedures are again begun, in block 102, as described above.

Other variations, modifications, omissions and additions will be apparent to those skilled in the art. Although the supply described herein has been shown in conjunction with an ion source, it will be understood that the modular conception and circuit features shown are employable in conjunction with any utilization of power supply features, and that the invention is accordingly limited only by the scope of the appended claims.

What is claimed is:

1. A multisource power supply used in supplying a plurality of predetermined power outputs from a common AC source, comprising
    a plurality of switchable power source modules, each of said modules being removable from said multisource power supply,
    a power line conditioner including a high voltage switching supply and a first logic voltage supply coupled between said AC source and each of said power source modules, and
    a common controller coupled to each of said power source modules for outputting control signals for setting and for receiving data signals for monitoring the power output of each of said power source modules,
    wherein said power line conditioner further includes an internal interlock control responsive to removal of any of said power source modules for disabling said high voltage switching supply and said power sources modules transform said high voltage switching supply into said plurality of predetermined power outputs in response to receipt of control signals from said common controller.

2. The supply of claim 1, wherein said power line conditioner further provides a second logic voltage supply, said internal interlock control upon activation disrupting only said high voltage supply and said first logic voltage supply.

3. The supply of claim 1, wherein each of said modules includes a display, said display being switchable between actual values being monitored and target values to be established.

4. The supply of claim 1, wherein each of said modules includes a first settable switch for allowing change of the power output of each said module, said common controller including a data entry keypad, and a second settable switch on each of said module for allowing data entry via said keypad.

5. The supply of claim 1, wherein said controller includes a memory, means entering a plurality of power outputs for each of said modules in said memory, and means for activating any of said plurality of power outputs as the start up mode of said supply.

6. The supply of claim 1, wherein each of said modules includes a display and a limit switch, means responsive to activation of said limit switch to display a preset limit on said display, and means for altering said limit.

7. The supply of claim 1, wherein said power modules are mounted in a rack, said controller constituting a further module mounted in said rack, said controller further including an external interlock control for inhibiting operation of said controller in response to predetermined disruption conditions external to said power supply and switch means coupled to said external interlock circuit for activating the power supply in the absence of a predetermined disruption condition.

8. The supply of claim 1, wherein said controller further includes means monitoring the actual output of each module when said controller directs each module to produce a zero output, means for storing said actual output as an offset correction, and means responsive to each subsequent monitoring of a module output to correct the monitored value by said offset.

9. The supply of claim 1, further including external interlock means, said controller monitoring said external interlock means and being responsive to a predetermined condition for setting the output of each of said power source modules to zero.

10. The supply of claim 1, wherein each of said power modules includes control means modulating the duty cycle of switching pulses for varying the power output of said power module, a first feedback loop returning actual power values to said control means for adjusting said power output, a second feedback loop returning actual power values to said common controller, said common controller responding to said feedback values for providing a data signal to at least one of said control means for effecting changes in the power output of at least one of said power modules.

11. The supply of claim 1, wherein said common controller is coupled to said power line conditioner for receiving an interrupt signal in response to removal of any of said power source modules.

12. A multisource power supply used in supplying a plurality of predetermined power outputs from a common AC source comprising
a plurality of switchable power source modules, each of said modules being removable from said supply,
a power line conditioner including a high voltage switching supply and logic level supply coupled between said AC source and each of said power source modules, and
a common controller coupled to each of said power source modules for outputting control signals for setting and for receiving data signals for monitoring the power output of each of said power source modules,
wherein said power line conditioner further includes an internal interlock control for sensing removal of any of said modules for disabling said high voltage switching supply, and
wherein each of said power source modules includes a source of pulses operatively coupled to said controller, a transformer for transforming said high voltage switching supply into one of said plurality of predetermined power outputs, a gating circuit coupled to said source of pulses and responsive to pulse inputs for driving said transformer to provide one of said plurality of predetermined power outputs, and means located between said source of pulses and said gating circuit for increasing the swing of said pulses, thereby creating faster rise times of the leading edges of said pulses to increase the switching speed of said gating circuit.

13. The supply of claim 12, wherein said means comprises a level shifting circuit which doubles the swing of said pulse.

14. A multisource power supply used in supplying a plurality of predetermined power outputs from a common AC source, comprising
a plurality of switchable power source modules, each of said modules being removable from said supply,
a power line conditioner including a high voltage switching supply and logic level supply coupled between said AC source and each of said power source modules, and
a common controller coupled to each of said power source modules for outputting control signals for setting and for receiving data signals for monitoring the power output of each of said power source modules,
wherein said power line conditioner further includes an internal interlock control for sensing removal of any of said power source modules for disabling said high voltage switching supply, and
wherein each of said power source modules include a source of pulses operatively coupled to said controller, a transformer for transforming said high voltage switching supply into one of said plurality of predetermined power outputs, a gating circuit coupled to said source of pulses and responsive to pulse inputs for driving said transformer to provide output power, and means located between said source of pulses and said gating circuit for increasing the swing of said pulses, thereby creating faster rise times of the leading edges of said pulse to increase the switching speed of said gating circuit,
said power line conditioner further including a first source of clock signals coupled to each of said power source modules, and
said controller including a second source of clock signals, said first and second sources of clock signals being asynchronous.

* * * * *

UNITED STATES PATENT AND TRADEMARK OFFICE
CERTIFICATE OF CORRECTION

PATENT NO. : 4,652,769

DATED : March 24, 1987

INVENTOR(S) : Robert B. Smith, et al.

It is certified that error appears in the above-identified patent and that said Letters Patent is hereby corrected as shown below:

Column 3, line 47, delete "understo'od" and insert --understood--.

Column 5, line 51, change "usin9" to --using--.

Column 6, line 4, after "ratio" insert --,--.

Column 6, line 10, after "conditions" insert --,--.

Column 7, line 24, delete "restore".

Column 7, line 46, delete ". input" and insert --. An input--.

Column 7, line 52, change "fs" to --is--.

Column 8, line 59, change "+8" to -- -8 --.

Column 9, line 25, after "lead" insert --is connected--.

Column 9, line 26, after "lead" insert --is connected--.

UNITED STATES PATENT AND TRADEMARK OFFICE
CERTIFICATE OF CORRECTION

PATENT NO. : 4,652,769

DATED : March 24, 1987

INVENTOR(S) : Robert B. Smith, et al.

It is certified that error appears in the above-identified patent and that said Letters Patent is hereby corrected as shown below:

Column 10, line 56, after "U5/2" insert --, the Q--.

Column 15, line 48, change "accelerizer" to --accelerator--.

Column 15, line 59, change "classes" to --class--.

Column 18, line 68, after "address" insert --will--.

Column 19, line, after "from" omit --.--.

Signed and Sealed this

Twenty-sixth Day of July, 1988

Attest:

DONALD J. QUIGG

Attesting Officer     Commissioner of Patents and Trademarks